United States Patent
Andersson et al.

(10) Patent No.: US 11,005,667 B2
(45) Date of Patent: *May 11, 2021

(54) COMPUTING DEVICE AND METHOD FOR PERFORMING A SECURE NEIGHBOR DISCOVERY

(71) Applicant: Kaloom Inc., Montreal (CA)

(72) Inventors: Per Andersson, Montreal (CA); Benoit Tremblay, Laval (CA); Suresh Krishnan, Suwanee, GA (US); Laurent Marchand, Montreal (CA)

(73) Assignee: Kaloom Inc., Montreal (CA)

( * ) Notice: Subject to any disclaimer, the term of this patent is extended or adjusted under 35 U.S.C. 154(b) by 176 days.

This patent is subject to a terminal disclaimer.

(21) Appl. No.: 16/143,577

(22) Filed: Sep. 27, 2018

(65) Prior Publication Data

US 2019/0288861 A1    Sep. 19, 2019

Related U.S. Application Data

(60) Provisional application No. 62/644,629, filed on Mar. 19, 2018.

(51) Int. Cl.
*H04L 9/32* (2006.01)
*H04L 12/751* (2013.01)
(Continued)

(52) U.S. Cl.
CPC ............ *H04L 9/3271* (2013.01); *H04L 45/02* (2013.01); *H04L 61/2069* (2013.01);
(Continued)

(58) Field of Classification Search
CPC . H04L 9/3271; H04L 63/164; H04L 61/2069; H04L 61/6059
(Continued)

(56) References Cited

U.S. PATENT DOCUMENTS 7,961,674 B2 * 6/2011 Jing ................ H04W 12/04031
370/328
9,736,686 B2    8/2017 Wifvesson et al.
(Continued)

FOREIGN PATENT DOCUMENTS

| CN | 100539501 C | 9/2009 |
| CN | 102438050 A | 5/2012 |
| CN | 105872063 A | 8/2016 |

OTHER PUBLICATIONS

"Secure Neighbor Discovery, RFC: 3971"—Arkko et al, Network Working Group, Mar. 2005 https://datatracker.ietf.org/doc/rfc3971/?include_text=1 (Year: 2005).*

(Continued)

*Primary Examiner* — Randy A Scott
(74) *Attorney, Agent, or Firm* — IP Delta Plus Inc.

(57) ABSTRACT

Computing devices and method for performing a secure neighbor discovery. A local computing device transmits an encrypted local node identifier and an encrypted local challenge to a remote computing device. The remote computing device generates a local challenge response based on the local challenge; and transmits an encrypted remote node identifier and an encrypted local challenge response to the local computing device. The local computing device determines that the received local challenge response corresponds to an expected local challenge response generated based on the local challenge. The remote computing device further transmits an encrypted remote challenge. The local computing device generates a remote challenge response based on the remote challenge; and transmits an encrypted remote challenge response to the remote computing device. The remote computing device determines that the received
(Continued)

remote challenge response corresponds to an expected remote challenge response generated based on the remote challenge.

12 Claims, 19 Drawing Sheets

(51) Int. Cl.
  *H04L 29/06* (2006.01)
  *H04L 29/12* (2006.01)
(52) U.S. Cl.
  CPC ...... *H04L 61/2092* (2013.01); *H04L 61/6022* (2013.01); *H04L 61/6059* (2013.01); *H04L 63/164* (2013.01); *H04L 61/2038* (2013.01); *H04L 61/6004* (2013.01); *Y02D 30/00* (2018.01)
(58) Field of Classification Search
  USPC ........ 713/156, 168, 171, 176, 182; 726/3, 5, 726/7, 12
  See application file for complete search history.

(56) References Cited

U.S. PATENT DOCUMENTS

| | | |
|---|---|---|
| 10,382,282 B1 * | 8/2019 | Levy-Yurista ...... G06F 3/04842 |
| 2003/0028763 A1 | 2/2003 | Malinen et al. |
| 2004/0151202 A1 | 8/2004 | Mandavilli et al. |
| 2006/0206616 A1 * | 9/2006 | Brown .................. H04L 67/104 709/229 |
| 2010/0191968 A1 | 7/2010 | Patil et al. |
| 2012/0173875 A1 * | 7/2012 | Mahidhara .......... H04L 63/0428 713/168 |
| 2013/0091269 A1 | 4/2013 | Zhang et al. |
| 2013/0107757 A1 | 5/2013 | Cherian et al. |
| 2014/0092779 A1 | 4/2014 | Seok et al. |
| 2015/0016407 A1 | 1/2015 | Erickson et al. |
| 2015/0207633 A1 | 7/2015 | Ravindran et al. |
| 2018/0262446 A1 | 9/2018 | Zuo |
| 2019/0052538 A1 | 2/2019 | Shih et al. |

OTHER PUBLICATIONS

Network Working Group RFC 3971—SEcure Neighbor Discovery, J. Arkko et al, Mar. 2005.

\* cited by examiner

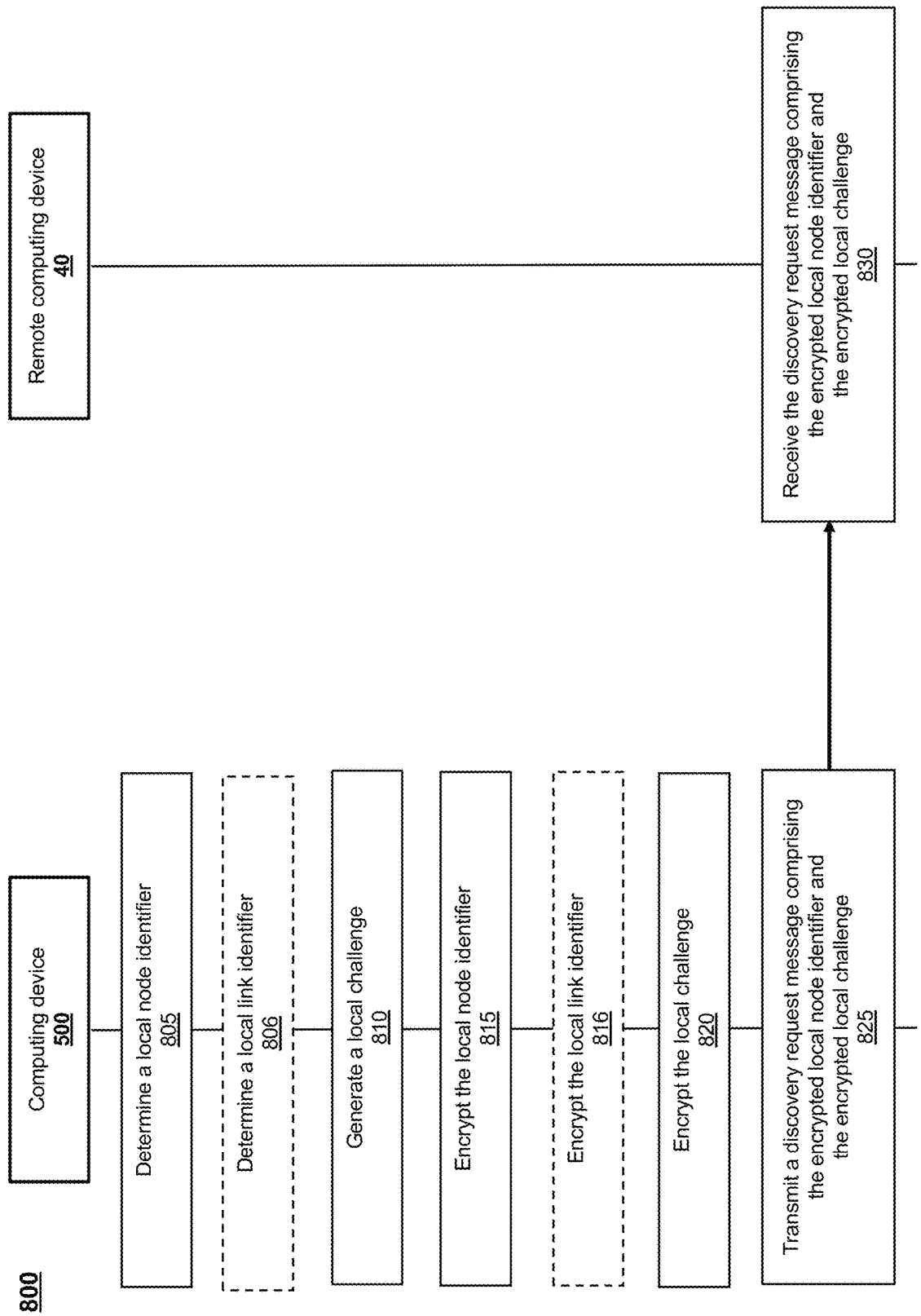

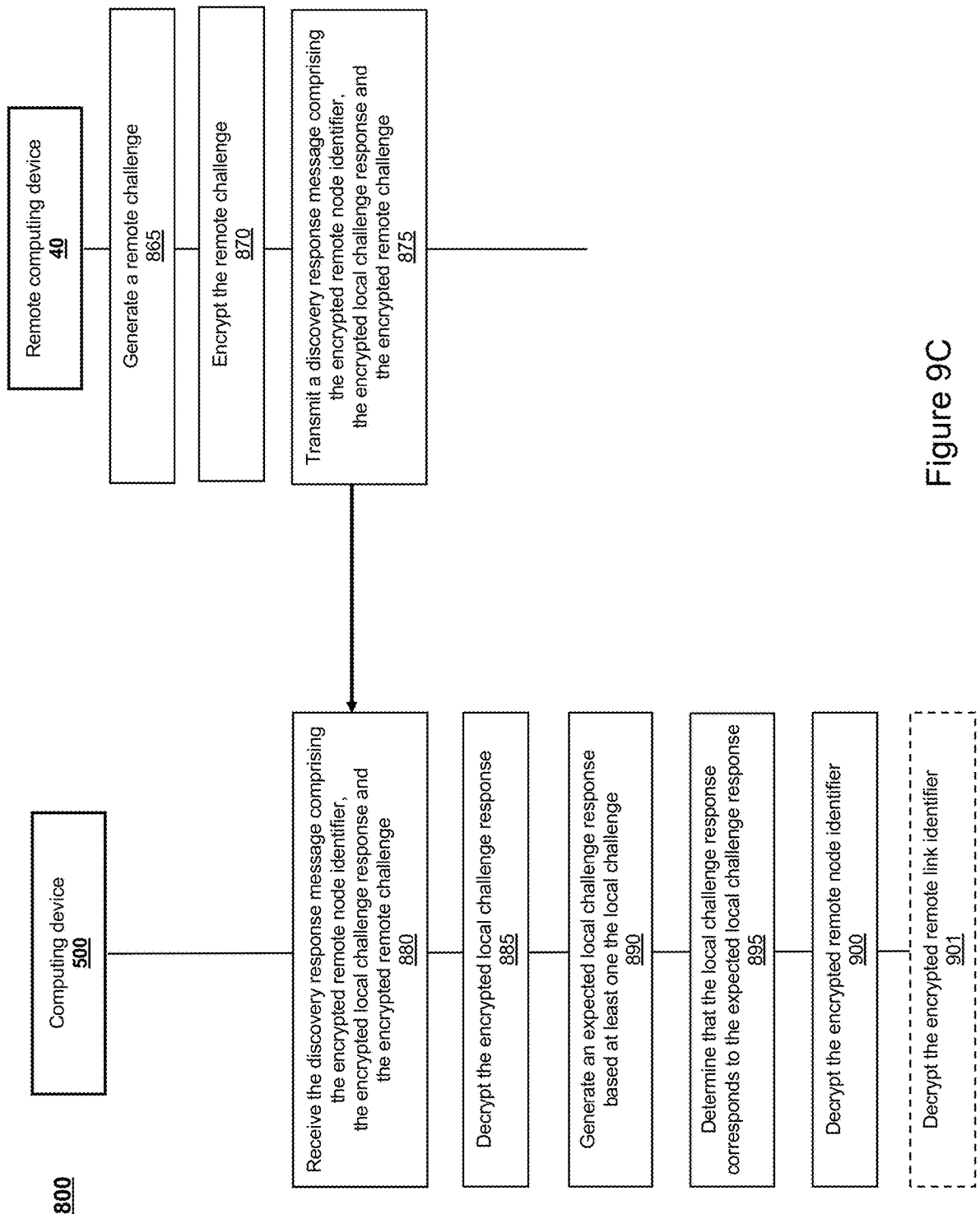

COMPUTING DEVICE AND METHOD FOR PERFORMING A SECURE NEIGHBOR DISCOVERY

TECHNICAL FIELD

The present disclosure relates to the field of data centers. More specifically, the present disclosure relates to a computing device and method for performing a network configuration of the computing device (located in a fabric of a data center) including performing a secure neighbor discovery.

BACKGROUND

Recent years have seen an increasing development of technologies such as Software as a Service (SaaS), cloud computing, etc. This development is fueled by a growing customer demand for products and services based on these types of technologies. This development is also fueled by constant progresses in underlying technologies, such as processing power increase for microprocessors, storage capacity increase for storage devices, and transmission capacity improvements for networking equipment. Furthermore, the average cost of these underlying technologies is falling. However, the decrease in the average cost of the underlying technologies is balanced by the increased customer demand, which requires to constantly update and upgrade the infrastructures used for providing SaaS or cloud computing.

The infrastructure used for providing SaaS or cloud computing is a data center, which combines a very large number of computing servers. Each server has a plurality of multi-core processors, and the combination of the computing servers provides a very high processing capacity, which is used by customers of the data center. Some or all of the servers may also have important storage capacities, so that the combination of the servers also provides a very high storage capacity to the customers of the data center. The data center also relies on a networking infrastructure, for interconnecting the servers and providing access to their computing and/or storage capacity to the customers of the data center. In order to provide a reliable service, very strong requirements in terms of scalability, manageability, fault-tolerance, etc., are imposed on the computing and networking infrastructure of the data center.

With respect to the networking infrastructure of the data center, it is well known that providing efficient and reliable networking services to a very large number of hosts is a complex task. Solutions and technologies have been developed in other contexts, such as networking technologies for providing mobile data services to a very large number of mobile devices. Some of these technologies have been standardized in dedicated instances, such as the Internet Engineering Task Force (IETF®) or the 3rd Generation Partnership Project (3GPP™). However, at least some of the technological challenges of deploying an efficient and reliable networking infrastructure in a data center are specific to the data center context; and need to be addressed with original solutions and technologies.

One substantial challenge with respect to a networking infrastructure involving a large number (e.g. tens of thousands) of devices is the configuration of the networking infrastructure. In particular, the configuration needs to be flexible (to facilitate changes to an initial configuration), resilient (to avoid that a localized configuration error affects operations of the whole data center) and secure (to prevent attacks on the networking infrastructure). One way to ensure that the network configuration is flexible and reliable is to limit as much as possible human intervention in the configuration process. One way to ensure that the network configuration is secure is to include security challenges in the network configuration.

Therefore, there is a need for a computing device and method for performing a secure neighbor discovery by the computing device located in a fabric of a data center. There is also a need for a method performing a network configuration of the computing device including the generation of a fabric-wide IPv6 address, the execution of the secure neighbor discovery, and the generation of one or more link IPv6 address.

SUMMARY

According to a first aspect, the present disclosure relates to a first computing device. The computing device comprises a communication interface and a processing unit. The processing unit determines a local node identifier for the communication interface and generates a local challenge. The processing unit encrypts the local node identifier into an encrypted local node identifier and the local challenge into an encrypted local challenge. The processing unit transmits via the communication interface a discovery request message comprising the encrypted local node identifier and the encrypted local challenge. The processing unit receives, from a remote computing device via the communication interface, a discovery response message comprising an encrypted remote node identifier and an encrypted local challenge response. The processing unit decrypts the encrypted local challenge response into a local challenge response. The processing unit generates an expected local challenge response based at least on the local challenge. The processing unit determines that the local challenge response corresponds to the expected local challenge response. The processing unit decrypts the encrypted remote node identifier into a remote node identifier.

According to a second aspect, the present disclosure relates to a second computing device. The computing device comprises a communication interface and a processing unit. The processing unit receives from a remote computing device via the communication interface a discovery request message comprising an encrypted remote node identifier and an encrypted remote challenge. The processing unit decrypts the encrypted remote node identifier into a remote node identifier and the encrypted remote challenge into a remote challenge. The processing unit generates a remote challenge response based at least on the remote challenge. The processing unit determines a local node identifier for the communication interface and encrypts the local node identifier into an encrypted local node identifier. The processing unit encrypts the remote challenge response into an encrypted remote challenge response. The processing unit transmits, to the remote computing device via the communication interface, a discovery response message comprising the encrypted local node identifier and the encrypted remote challenge response.

According to a third aspect, the present disclosure relates to a method for performing a secure neighbor discovery in a fabric of a data center. The method comprises determining by a local processing unit of a local computing device a local node identifier for a communication interface of the local computing device. The method comprises generating by the local processing unit a local challenge. The method comprises encrypting by the local processing unit the local node identifier into an encrypted local node identifier and the local challenge into an encrypted local challenge. The method comprises transmitting, via a communication interface of the local computing device, a discovery request message comprising the encrypted local node identifier and the encrypted local challenge. The method comprises receiving via a communication interface of a remote computing device the discovery request message. The method comprises decrypting, by a remote processing unit of the remote computing device, the encrypted local node identifier into the local node identifier and the encrypted local challenge into the local challenge. The method comprises generating by the remote processing unit a local challenge response based at least on the local challenge. The method comprises determining by the remote processing unit a remote node identifier for a communication interface of the remote computing device. The method comprises encrypting by the remote processing unit the remote node identifier into an encrypted remote node identifier and the local challenge response into an encrypted local challenge response. The method comprises transmitting, to the local computing device via the communication interface of the remote computing device, a discovery response message comprising the encrypted remote node identifier and the encrypted local challenge response. The method comprises receiving via the communication interface of the local computing device the discovery response message. The method comprises decrypting by the local processing unit the encrypted local challenge response into the local challenge response. The method comprises generating by the local processing unit an expected local challenge response based at least on the local challenge. The method comprises determining by the local processing unit that the local challenge response corresponds to the expected local challenge response. The method comprises decrypting by the local processing unit the encrypted remote node identifier into the remote node identifier.

In a particular aspect, the method further comprises generating by the remote processing unit a remote challenge and encrypting the remote challenge into an encrypted remote challenge. The method further comprises transmitting the encrypted remote challenge into the discovery response message. The method further comprises decrypting by the local processing unit the encrypted remote challenge into the remote challenge. The method further comprises generating by the local processing unit a remote challenge response based at least on the remote challenge; and encrypting the remote challenge response into an encrypted remote challenge response. The method further comprises transmitting, to the remote computing device via the communication interface of the local computing device, a discovery acknowledgment message comprising the encrypted remote challenge response. The method further comprises receiving via the communication interface of the remote computing device the discovery acknowledgment message. The method further comprises decrypting by the remote processing unit the encrypted remote challenge response into the remote challenge response. The method further comprises generating by the remote processing unit an expected remote challenge response based at least on the remote challenge. The method further comprises determining by the remote processing unit that the remote challenge response corresponds to the expected remote challenge response.

According to a fourth aspect, the present disclosure relates to a computing device. The computing device comprises a communication interface and a processing unit. The processing unit determines a local node identifier for the communication interface. The processing unit generates a local challenge. The processing unit encrypts a combination of the local node identifier and the local challenge into an encrypted combination of the local node identifier and the local challenge. The processing unit transmits via the communication interface a discovery request message comprising the encrypted combination of the local node identifier and the local challenge. The processing unit receives from a remote computing device via the communication interface a discovery response message comprising an encrypted combination of a remote node identifier and a local challenge response. The processing unit decrypts the encrypted combination of the remote node identifier and the local challenge response into the remote node identifier and the local challenge response. The processing unit generates an expected local challenge response based at least on the local challenge. The processing unit determines that the local challenge response corresponds to the expected local challenge response.

According to a fifth aspect, the present disclosure relates to a computing device. The computing device comprises a communication interface and a processing unit. The processing unit receives from a remote computing device via the communication interface a discovery request message comprising an encrypted combination of a remote node identifier and a remote challenge. The processing unit decrypts the encrypted combination of the remote node identifier and the remote challenge into the remote node identifier and the remote challenge. The processing unit generates a remote challenge response based at least on the remote challenge. The processing unit determines a local node identifier for the communication interface. The processing unit encrypts a combination of the local node identifier and the remote challenge response into an encrypted combination of the local node identifier and the remote challenge response. The processing unit transmits to the remote computing device via the communication interface a discovery response message comprising the encrypted combination of the local node identifier and the remote challenge response.

BRIEF DESCRIPTION OF THE DRAWINGS

Embodiments of the disclosure will be described by way of example only with reference to the accompanying drawings, in which:

FIGS. 9A, 9B, 9C and 9D represent a method for performing a secure neighbor discovery;

DETAILED DESCRIPTION

The foregoing and other features will become more apparent upon reading of the following non-restrictive description of illustrative embodiments thereof, given by way of example only with reference to the accompanying drawings.

Various aspects of the present disclosure generally address one or more of the problems related to the execution of a secure neighbor discovery by a computing device located in a fabric of a data center; where the secure neighbor discovery is based on a security challenge. The present disclosure also addresses a network configuration of the computing device including the generation of a fabric-wide IPv6 address, the execution of the secure neighbor discovery, and the generation of one or more link IPv6 address.

Network Architecture of a Data Center

Referring now concurrently to FIGS. 1-4, the network architecture of a data center is illustrated. The network architecture represented in the figures is for illustration purposes, and a person skilled in the art of designing data center architectures would readily understand that other design choices could be made. The teachings of the present disclosure are not limited to the topology of the network architecture represented in the figures; but could also be applied to a network architecture with different design choices in terms of topology.

Figure 1:
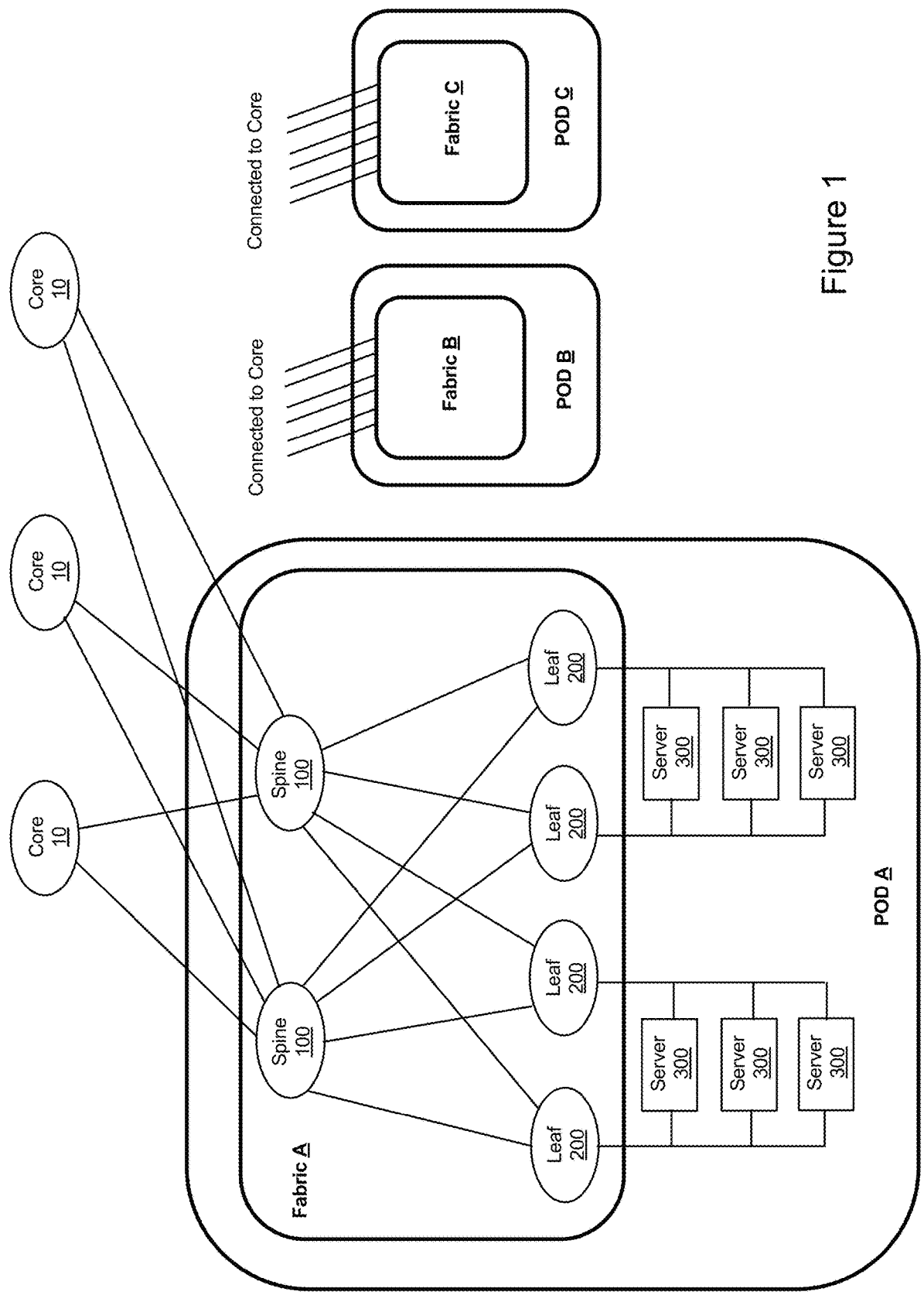
FIG. 1 represents a network architecture of a data center comprising a plurality of pods and fabrics.

Reference is now made more particularly to FIG. 1. The data center is organized into a plurality of pods. Each pod consists of an atomic unit of computing, storage, networking and power. Each pod is designed as a unit, deployed as a unit, automated as a unit, and retired as a unit. Several types of pods may be available, which differ by their design. Zero, one or more instances of each type of pod is deployed in the data center. For illustration purposes, three pods (A, B and C) have been represented in FIG. 1. However, the number of pods in the data center varies from one to tens or even hundreds of pods. The capacity in terms of computing, storage, networking and power of the data center is scaled, by adding (or removing) pods.

Pod A comprises a plurality of servers 300 providing the processing and storage power. The servers 300 are physically organized in one or more racks, depending on the number of servers 300 and the capacity of each rack. Pod A also comprises two hierarchical levels of networking power referred to as fabric A. Fabric A comprises a lower hierarchical level consisting of leaf networking equipment 200, and an upper hierarchical level consisting of spine networking equipment 100. The networking equipment (e.g. spine 100 and leaf 200) of fabric A are physically integrated to the one or more racks comprising the servers 300, or alternatively are physically organized in one or more independent racks.

The leaf networking equipment 200 and the spine networking equipment 100 generally consist of switches, with a high density of communication ports. Therefore, in the rest of the description, the leaf networking equipment 200 and the spine networking equipment 100 will be respectively referred to as leaf switches 200 and spine switches 100. However, other types of networking equipment may be used. For example, in an alternative implementation, at least some of the spine networking equipment 100 consist of routers.

Each leaf switch 200 is connected to at least one spine switch 100, and a plurality of servers 300. The number of servers 300 connected to a given leaf switch 200 depends on the number of communication ports of the leaf switch 200.

In the implementation represented in FIG. 1, each server 300 is redundantly connected to two different leaf switches 200. A server 300 of a given pod (e.g. pod A) is only connected to leaf switches 200 of the fabric (e.g. fabric A) belonging to the given pod (e.g. pod A). A server 300 of a given pod (e.g. pod A) is not connected to leaf switches 200 of a fabric (e.g. fabric B) belonging to another pod (e.g. pod B). Each leaf switch 200 of a given fabric (e.g. fabric A) is connected to all the spine switches 100 of the given fabric (e.g. fabric A). A leaf switch 200 of a given fabric (e.g. fabric A) is not connected to a spine switch 100 of another fabric (e.g. fabric B). In an alternative implementation not represented in the Figures, at least some of the servers 300 are connected to a single leaf switch 200.

Each spine switch 100 is connected to at least one core networking equipment 10, and a plurality of leaf switches 200. The number of leaf switches 200 connected to a given spine switch 100 depends on design choices and on the number of communication ports of the spine switch 100. The core networking equipment 10 provide interworking between the fabrics deployed in the data center, connection to management functionalities of the data center, connection to external networks such as the Internet, etc. Furthermore, although not represented in the Figures for simplification purposes, at least some of the core networking equipment 10 may be connect to a pair of leaf switches 200.

The core networking equipment 10 generally consist of routers. Therefore, in the rest of the description, the core networking equipment 10 will be referred to as core routers 10. However, other types of networking equipment may be used. For example, in an alternative implementation, at least some of the core networking equipment 10 consist of switches.

In the implementation represented in FIG. 1, each spine switch 100 of a given fabric (e.g. fabric A) is connected to all the core routers 10, and is connected to all the leaf switches 200 of the given fabric (e.g. fabric A).

For simplification purposes, fabric A represented in FIG. 1 only comprises two spine switches 100 and four leaf switches 200, while pod A only comprises two groups of three servers 300 respectively connected to leaf switches 200 of the fabric A. However, the number of spine switches 100 and leaf switches 200 of a fabric may vary, based on design choices and networking capabilities (e.g. communication port density) of the spine and leaf switches. Similarly, the total number of servers 300 of a pod may vary, based on design choices, based on the number of leaf switches 200 of the corresponding fabric, and based on networking capabilities (e.g. communication port density) of the leaf switches.

The details of pod B and its corresponding fabric B, as well as pod C and its corresponding fabric C, are not represented in FIG. 1 for simplification purposes. However, pod B/fabric B and pod C/fabric C include a hierarchy of spine switches 100, leaf switches 200 and servers 300 similar to the hierarchy illustrated for pod A/fabric A.

Figure 2:
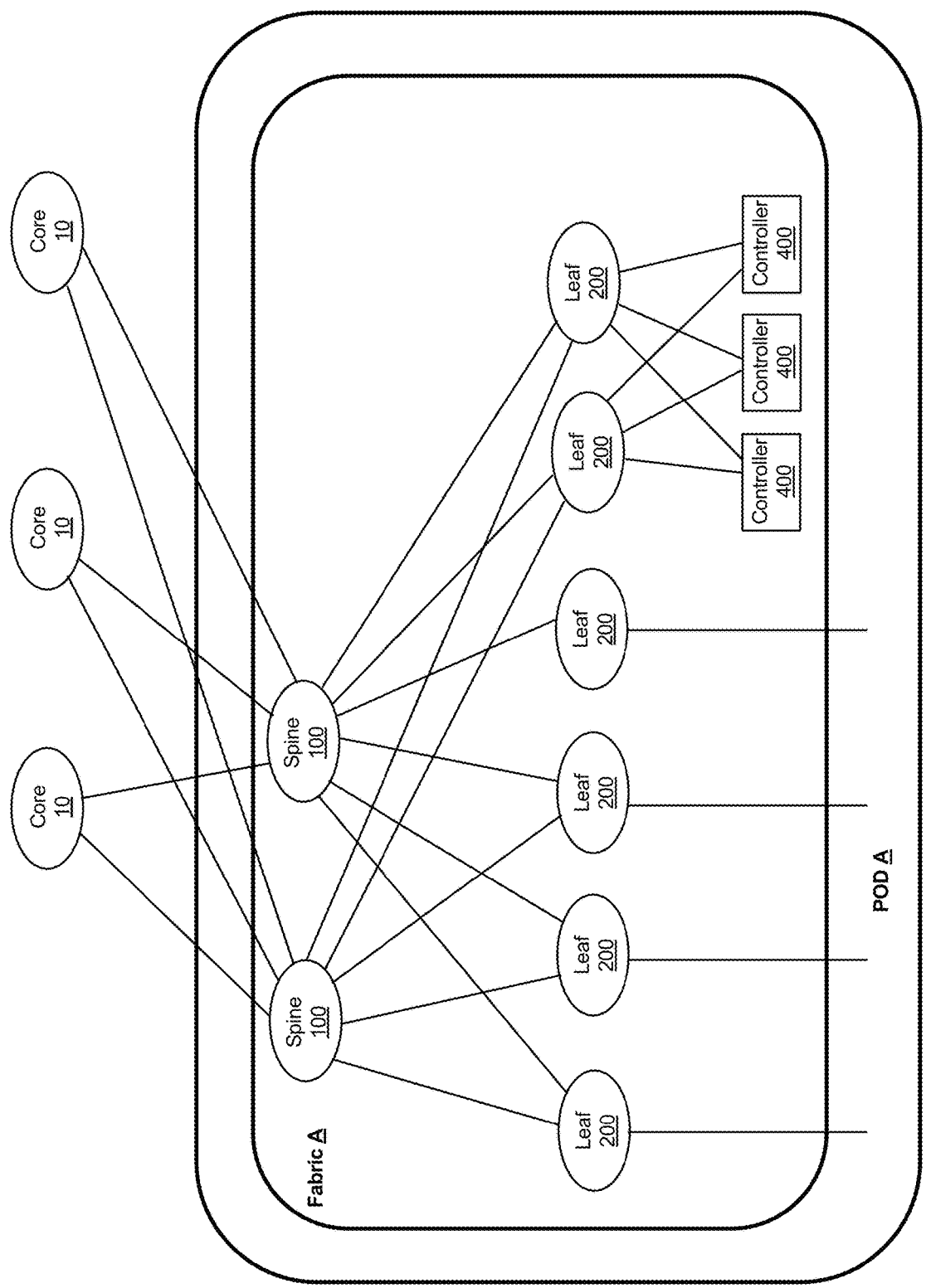
FIG. 2 represents a more detailed view of the fabrics represented in FIG. 1.

Reference is now made more particularly to FIGS. 1 and 2, where FIG. 2 represents an implementation of the data center of FIG. 1, where each fabric further includes one or more controllers 400. The servers 300 have not been represented in FIG. 2 for simplification purposes only.

The controllers 400 of a fabric are responsible for controlling operations of at least some of the nodes (e.g. leaf switches 200 and/or spine switches 100) included in the fabric. Each controller 400 is connected to at least one leaf switch 200. The number of controllers 400 deployed in a given fabric depends on design choices, on the required cumulative processing power of the controllers 400 deployed in the fabric, on the total number of leaf and spine switches deployed in the fabric, etc.

In the implementation represented in FIG. 2, each controller 400 is redundantly connected to two different leaf switches 200. For example, each controller 400 has a first operational connection to a first leaf switch 200, and a second backup connection to a second leaf switch 200. A controller 400 of a given fabric (e.g. fabric A) is only connected to leaf switches 200 of the fabric (e.g. fabric A). A controller 400 of a given fabric (e.g. fabric A) is not connected to leaf switches 200 of another fabric (e.g. fabric B or C). Some leaf switches 200 are dedicated to being connected to controllers 400 (as illustrated in FIG. 2), while other leaf switches 200 are dedicated to being connected to servers 300 (as illustrated in FIG. 1). In an alternative implementation, a leaf switch 200 is concurrently connected to servers 300 and controllers 400.

In another implementation, the controllers 400 are not directly physically connected to the leaf switches 200; but are functionally connected via at least one intermediate equipment such as an intermediate switch (not represented in FIG. 2) between the controllers 400 and the leaf switches 200.

Figure 3:
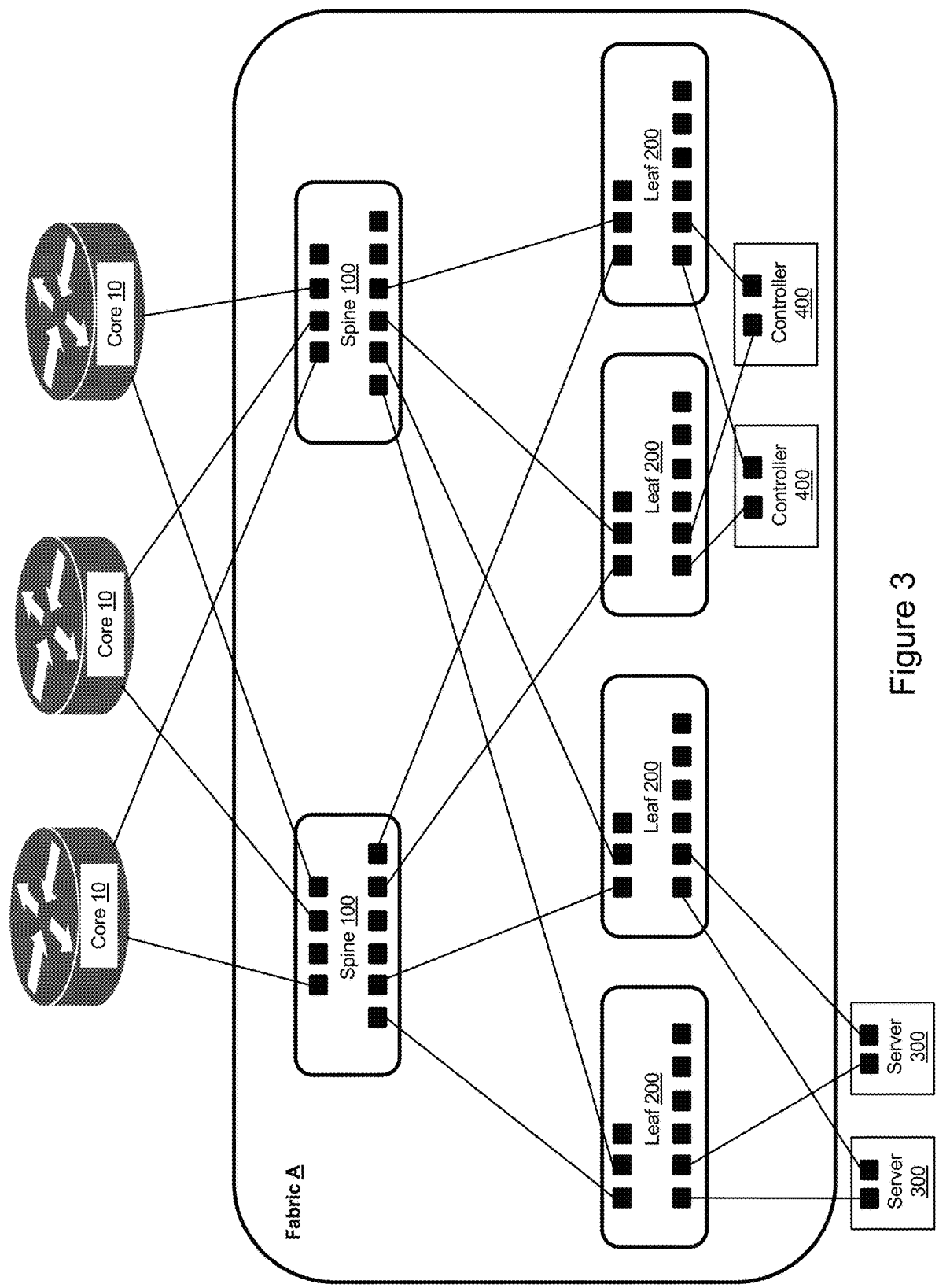
FIG. 3 represents communication ports of the equipment deployed in the pods and fabrics of FIGS. 1-2.

Reference is now made more particularly to FIGS. 1, 2 and 3, where FIG. 3 represents communication ports of the equipment deployed in a fabric/pod.

The spine switches 100 have a dedicated number of uplink communication ports (e.g. 4 represented in FIG. 3) dedicated to the interconnection with the core routers 10, and a dedicated number of downlink communication ports (e.g. 6 represented in FIG. 3) dedicated to the interconnection with the leaf switches 200. The uplink and downlink ports have the same or different networking capabilities. For example, all the ports have a capacity of 10 Gigabytes (Gbps).

The leaf switches 200 have a dedicated number of uplink communication ports (e.g. 3 represented in FIG. 3) dedicated to the interconnection with the spine switches 100, and a dedicated number of downlink communication ports (e.g. 6 represented in FIG. 3) dedicated to the interconnection with the servers 300 or controllers 400. The uplink and downlink ports have the same or different networking capabilities. For example, all the uplink ports have a capacity of 100 Gbps and all the downlink ports have a capacity of 25 Gbps. In the future, the capacity of the uplink ports will reach 200 or 400 Gbps, while the capacity of the downlink ports will reach 50 Gbps or 100 Gbps.

The leaf and spine switches generally consist of equipment with a high density of communication ports, which can reach a few dozens of ports. Some of the ports may be electrical ports, while others are fiber optic ports. As mentioned previously, the ports of a switch may have varying networking capabilities in terms of supported bandwidth. Switches with different networking capabilities and functionalities are generally used for implementing the leaf switches and the spine switches. The ports are not limited to communication ports, but also include enclosures for connecting various types of pluggable media.

By contrast, the servers 300 and controllers 400 are computing devices similar to traditional computers, with a limited number of communication ports. For example, each server 300 and each controller 400 comprises two communication ports, respectively connected to two different leaf switches 200. The two communication ports generally consist of Ethernet ports, with a capacity of for example 10 Gbps. However, the servers 300 and/or controllers 400 may include additional port(s).

All the aforementioned communication ports are bidirectional, allowing transmission and reception of data.

Figure 4A:
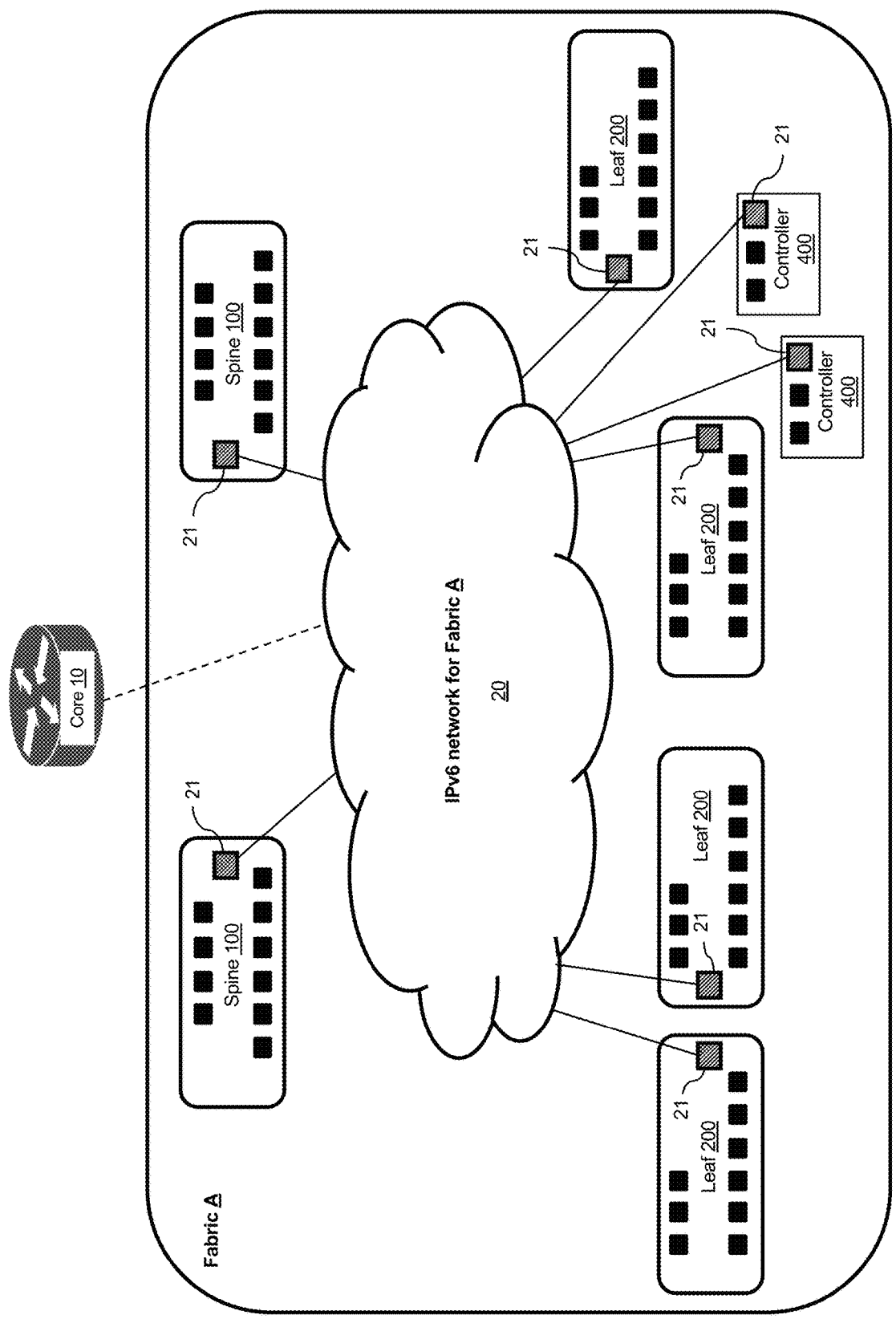
FIGS. 4A and 4B represent an IPv6 network for interconnecting equipment of the fabrics represented in FIGS. 1-3.
Figure 4B:
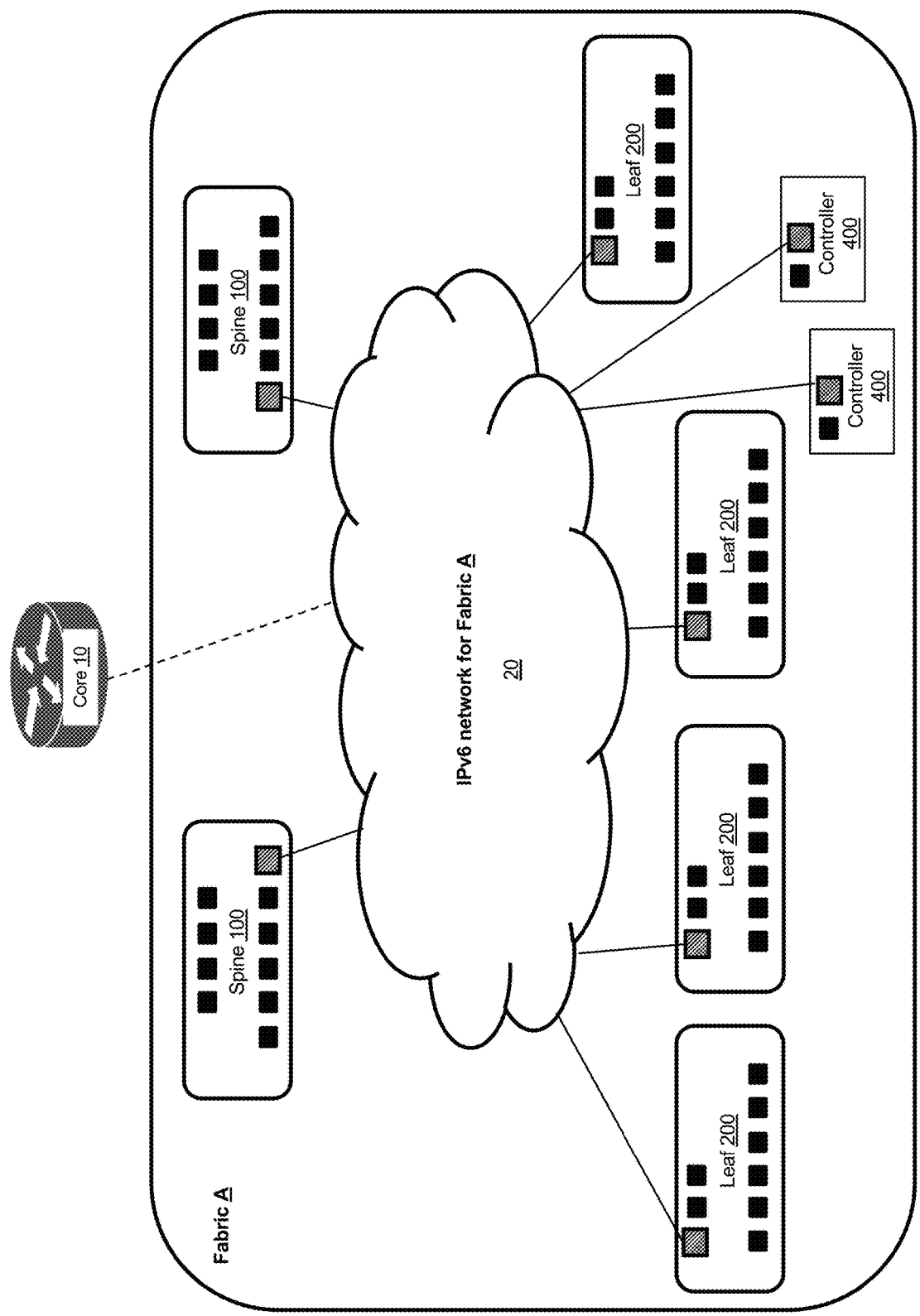

Reference is now made more particularly to FIGS. 4A and 4B, which represent the deployment of an IPv6 network 20 at the fabric level.

At least some of the equipment of the fabric are connected to the IPv6 network 20 and exchange data via this IPv6 network. In the configuration illustrated in FIGS. 4A and 4B, all the spine switches 100, leaf switches 200 and controllers 400 are connected to the IPv6 network 20. Each fabric (e.g. fabrics A, B and C as illustrated in FIG. 1) has its own IPv6 network, with a dedicated IPv6 prefix for each fabric. The generation of the dedicated IPv6 prefix of a given fabric will be illustrated later in the description.

Optionally, additional equipment are connected to the IPv6 network 20. For example, one or more of the core routers 10 are connected to the IPv6 network 20, as illustrated in FIGS. 4A and 4B. Configuration and/or management servers (not represented in FIGS. 4A and 4B for simplification purposes) have access to the IPv6 network 20 through the core router 10.

Optionally, a dedicated switch and/or router (not represented in FIGS. 4A and 4B for simplification purposes) is used for interconnecting the equipment of the fabric A which exchange data via the IPv6 network 20. The aforementioned optional configuration and/or management servers have access to the IPv6 network 20 through the dedicated switch and/or router.

FIG. 4A represents a first illustrative configuration where each equipment of the fabric A (spine switch 100, leaf switch 200 and controller 400) has a dedicated port 21 for accessing the IPv6 network 20. The IPv6 network 20 is a configuration and/or management network isolated from the other IP networks implemented by the fabric A. The dedicated ports 21 of the spine switches 100, leaf switches 200 and controllers 400 are only used to exchange data through the IPv6 network 20. Thus, the IPv6 traffic exchanged via the dedicated ports 21 of the spine switches 100, leaf switches 200 and controllers 400 is isolated from the traffic exchanged via the other ports of the spine switches 100, leaf switches 200 and controllers 400 (illustrated in FIG. 3).

FIG. 4B represents a second illustrative configuration where each equipment of the fabric A (spine switch 100, leaf switch 200 and controller 400) does not use a dedicated port for accessing the IPv6 network 20. On the contrary, a port already used for exchanging other data traffic (illustrated in FIG. 3) is also used for accessing the IPv6 network 20.

This configuration has the advantage of not monopolizing a dedicated port at each equipment of the fabric A (spine switch 100, leaf switch 200 and controller 400) solely for accessing the IPv6 network 20.

In an alternative configuration not represented in the Figures, some of the equipment of the fabric A are using a dedicated port for accessing the IPv6 network 20; while other equipment of the fabric A access the IPv6 network 20 through a port also used for exchanging other data traffic. Furthermore, some of the equipment of the fabric A may use more than one port for accessing the IPv6 network 20.

Figure 5:
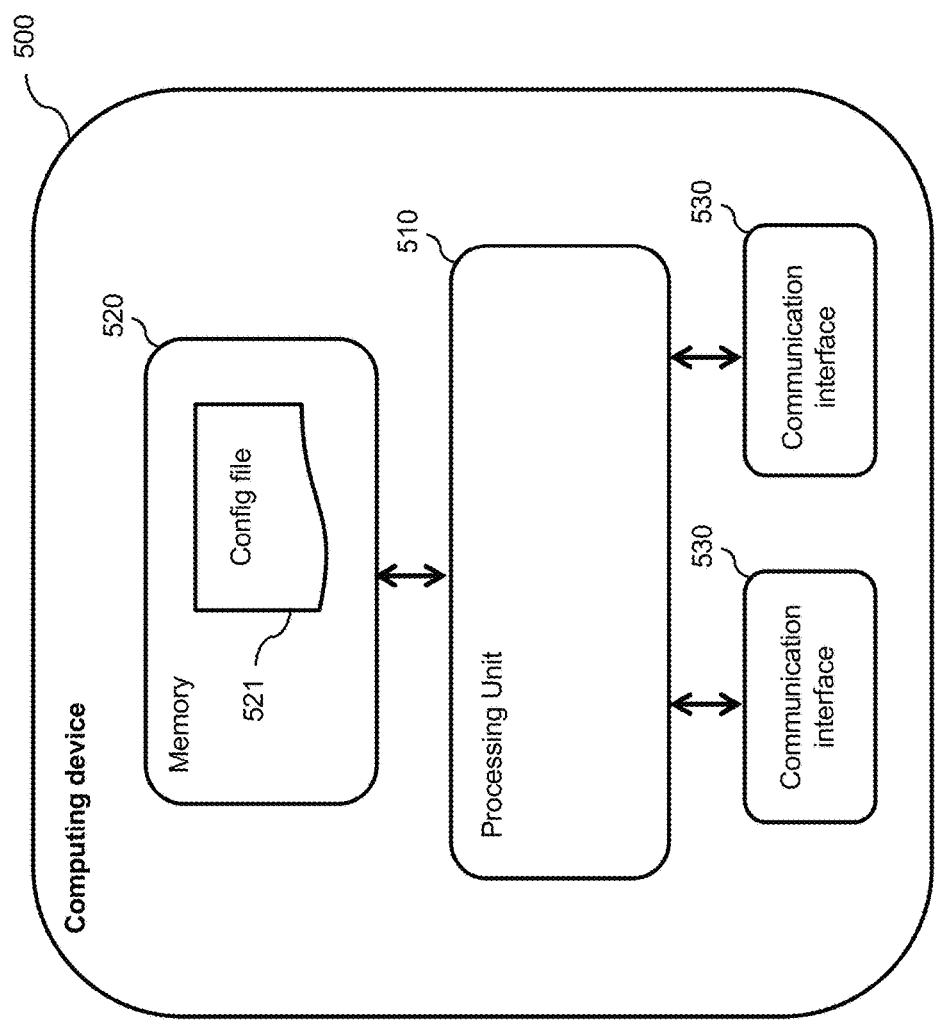
FIG. 5 illustrates a schematic representation of a computing device corresponding to equipment deployed in the fabrics represented in FIGS. 1-3.

Referring now concurrently to FIGS. 4A-B and 5, a computing device 500 is illustrated in FIG. 5. The computing device 500 is a generic functional representation of the devices comprised in the fabric of FIGS. 4A and 4B. Thus, the computing device 500 represents a spine switch 100, a leaf switch 200 or a controller 400.

The computing device 500 comprises a processing unit 510, memory 520, and at least one communication interface 530. The computing device 500 may comprise additional components (not represented in FIG. 5 for simplification purposes). For example, in the case where the computing device 500 represents a controller 400, the computing device may include a user interface and/or a display.

The processing unit 510 comprises one or more processors (not represented in FIG. 5) capable of executing instructions of a computer program. Each processor may further comprise one or several cores. In the case where the computing device 500 represents a switch 100 or 200, the processing unit 510 further includes one or more dedicated processing components (e.g. a network processor, an Application Specific Integrated Circuits (ASIC), etc.) for performing specialized networking functions (e.g. packet forwarding).

The memory 520 stores instructions of computer program(s) executed by the processing unit 510, data generated by the execution of the computer program(s) by the processing unit 510, data received via the communication interface(s) 530, etc. Only a single memory 520 is represented in FIG. 5, but the computing device 500 may comprise several types of memories, including volatile memory (such as Random Access Memory (RAM)) and non-volatile memory (such as a hard drive, Erasable Programmable Read-Only Memory (EPROM), Electrically-Erasable Programmable Read-Only Memory (EEPROM), etc.).

Each communication interface 530 allows the computing device 500 to exchange data with other devices. At least some of the communication interfaces 530 (only two are represented in FIG. 5 for simplification purposes) correspond to the ports of the spine switches 100, leaf switches 200, and controller 400 represented in FIGS. 4A and 4B. Examples of communication interfaces 530 include standard (electrical) Ethernet ports, fiber optic ports, ports adapted for receiving Small Form-factor Pluggable (SFP) units, etc. The communication interfaces 530 are generally of the wireline type; but may also include some wireless ones (e.g. a Wi-Fi interface). The communication interface 530 comprises a combination of hardware and software executed by the hardware, for implementing the communication functionalities of the communication interface 530. Alternatively, the combination of hardware and software for implementing the communication functionalities of the communication interface 530 is at least partially included in the processing unit 510.

Fabric-Wide IPv6 Address

Figure 6:
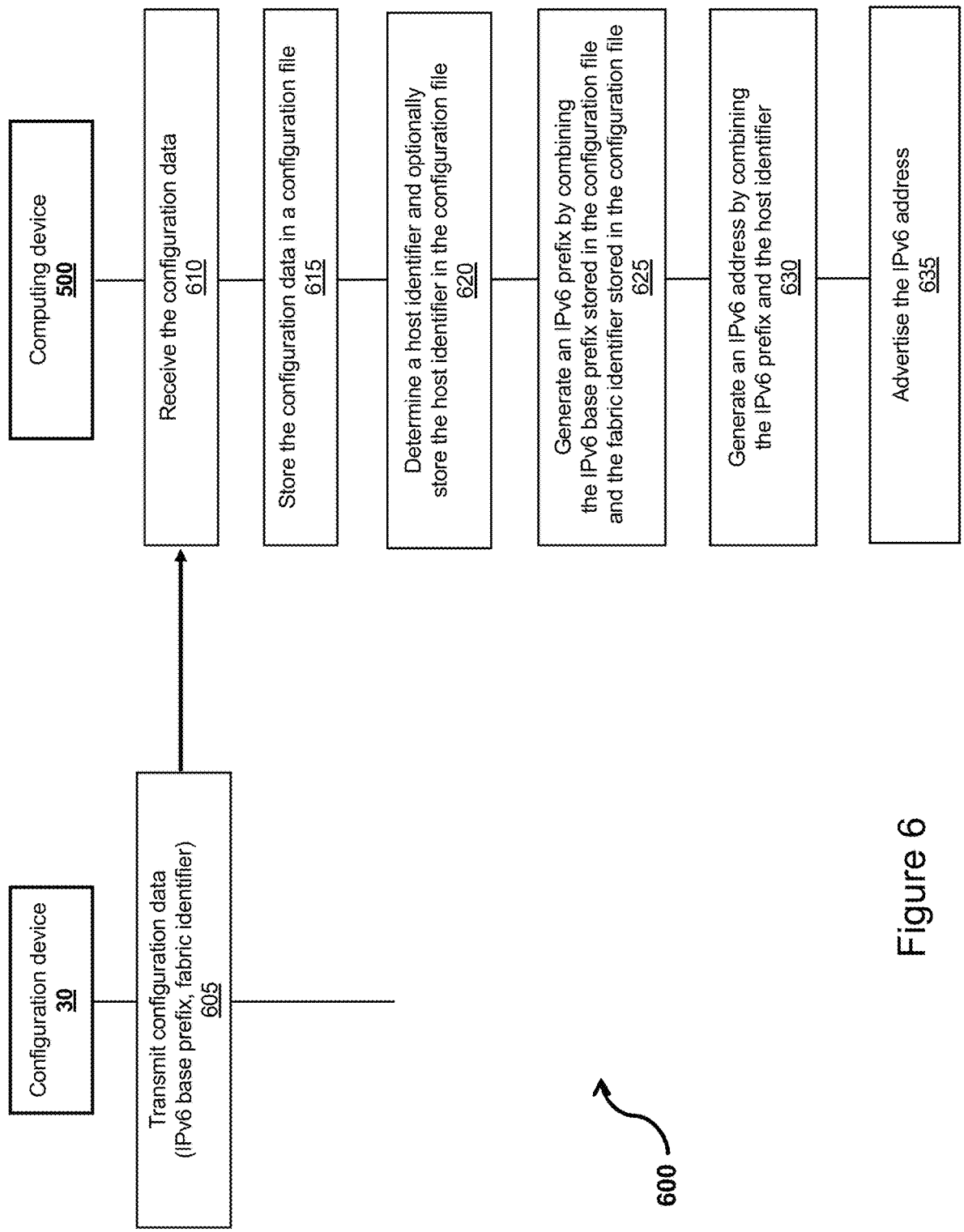
FIG. 6 represents a method for generating a fabric-wide IPv6 address.

Referring now concurrently to FIGS. 4A-B, 5 and 6, a method 600 for generating a fabric-wide IPv6 address is illustrated in FIG. 6. At least some of the steps of the method 600 are performed by the computing device 500 represented in FIG. 5.

A dedicated computer program has instructions for implementing at least some of the steps of the method 600. The instructions are comprised in a non-transitory computer program product (e.g. the memory 520) of the computing device 500. The instructions, when executed by the processing unit 510 of the computing device 500, provide for generating a fabric-wide IPv6 address. The instructions are deliverable to the computing device 500 via an electronically-readable media such as a storage media (e.g. CD-ROM, USB key, etc.), or via communication links (e.g. via a communication network through one of the communication interfaces 530).

The method 600 comprises the step 605 of transmitting configuration data by a configuration device 30 to the computing device 500.

The method 600 comprises the step 610 of receiving the configuration data by the computing device 500. The configuration data are received via one of the communication interfaces 530 of the computing device 500.

The method 600 comprises the step 615 of storing the configuration data in a configuration file 521. The configuration file 521 is stored in the memory 520 of the computing device 500. The configuration data comprise an IPv6 base prefix and a fabric identifier, which will be further detailed in the following steps of the method 600.

The details of the generation and transmission of the configuration data by the configuration device 30 are out of the scope of the present disclosure. A single configuration device 30 is used at the data center level for transmitting the configuration data to the computing devices 500 in each of the fabrics. Alternatively, a dedicated configuration device 30 is used for each of the fabrics of the data center. A person skilled in the art designing data center architectures would readily identify adequate networking protocols and configuration mechanisms for distributing the configuration data from a centralized configuration device 30 to the plurality of computing devices 500 of the fabrics.

Steps 605 and 610 are performed at the initiative of the configuration device 30 (push of the configuration data) or at the initiative of the computing device 500 (pull of the configuration data). In the case of a pull, an additional step comprising a request of the configuration data from the computing device 500 to the configuration device 30 is not represented in FIG. 6 for simplification purposes.

Steps 605 and 610 may occur when the computing device 500 is initially deployed in the fabric. In this case, the computing device 500 is not connected at all (or only partially connected) to any networking infrastructure of the data center. Thus, the configuration data are directly transmitted from the configuration device 30 to the computing device 500 using a basic bootstrap protocol. For instance, a communication interface of the configuration device 30 is physically connected (e.g. via an Ethernet cable) to a communication interface of the computing device 500, and the bootstrap protocol operates on this temporary physical connection for performing the transfer of the configuration data.

The method 600 comprises the step 620 of determining a host identifier and optionally storing the host identifier in the configuration file 521. Step 620 is executed by the processing unit 510 of the computing device 500.

The storage of the host identifier in the configuration file 521 is optional. Alternatively, the host identifier is simply used at other steps of the method 600, without requiring storage of the host identifier in a configuration file. However, it may be more efficient to determine the host identifier only once (for instance if the determination implies calculations), and store it in the configuration file 521, so that it can be used whenever needed without the need to calculate it again.

Thus, the determination of the host identifier comprises one of the following: selecting the host identifier, calculating the host identifier and reading the host identifier from the configuration file 521.

In a first implementation, the host identifier is a selected 48 bits integer in hexadecimal format. For example, the host identifier is a Media Access Control (MAC) address. If at least one of the communication interfaces 530 of the computing device 500 has a Media Access Control (MAC) address, then the processing unit 510 selects the MAC address of one of the communication interfaces 530 as the host identifier. Since the IPv6 address generated by the method 600 is not associated to a specific communication interface 530 among all the communication interfaces 530 of the computing device 500, any one of the MAC addresses allocated to the computing device 500 can be selected for being the host identifier. For instance, the selected MAC address is the MAC address of the communication interface 530 used for receiving the configuration data at step 610. Equipment such as the switches (spine 100 and/or leaf 200) generally have a dedicated management interface, which is used for performing step 610. The MAC address of the management interface is used for the host identifier.

In a second implementation, the host identifier is determined by calculating a hash of a 128 bits Universal Unique Identifier (UUID) of the computing device 500. For example, the hash of the 128 bits UUID is also a 48 bits integer in hexadecimal format. UUIDs are well known in the art. A UUID is calculated for a given computing device based on various methods (e.g. randomly, using a combination of a MAC address and a timestamp, etc.). The chances of the UUID of a given computing device being identical to the UUID of another device are very low.

The timing for performing step 620 may vary. For example, step 620 is performed before step 610 or after step 625.

The host identifier is not necessarily based on either a MAC address or an UUID. Alternatively, it is calculated based on other seed data, as long as it is unique (or at least has a very high probability of being unique).

The method 600 comprises the step 625 of generating an IPv6 prefix by combining the IPv6 base prefix stored in the configuration file 521 and the fabric identifier stored in the configuration file 521. As mentioned previously, the IPv6 base prefix and the fabric identifier are comprised in the configuration data received at step 610.

An IPv6 address is composed of 128 bits, with the first n bits consisting of the subnet prefix. It is common practice in IPv6 networking to reserve the 64 first bits of the IPv6 address for the subnet prefix (/64 prefix).

The IPv6 prefix generated at step 625 has a length of N bits (generally 64). The IPv6 base prefix stored in the configuration file 521 is an IPv6 prefix with a length of B bits (e.g. 48) lower than N. The fabric identifier stored in the configuration file 521 has a length of I bits. For example, the fabric identifier is a 16 bits integer. Each fabric (e.g. fabric A, fabric B and fabric C in FIG. 1) in the data center has a unique fabric identifier, different from the fabric identifiers of the other fabrics in the data center.

The following relationship applies: B+I<=N.

In an exemplary implementation, the IPv6 prefix is generated as follows: the fabric identifier is directly appended to the IPv6 base prefix. For instance, the IPv6 base prefix is FD10:0:0/48, the fabric identifier is a 16 bits integer <fabric_id>, and the generated IPv6 prefix is FD10:0:0:<fabric_id>::/64.

In another exemplary implementation, the IPv6 prefix is generated as follows. The IPv6 prefix begins with the IPv6 base prefix followed by zeros and terminates with the fabric identifier. For instance, the IPv6 base prefix is FD10::/16, the fabric identifier is a 16 bits integer <fabric_id>, and the generated IPv6 prefix is FD10:0:0:<fabric_id>::/64. In this case, the optional zeros consist of bits 17 to 48 of the IPv6 prefix.

In still another exemplary implementation, the IPv6 prefix is generated as follows. The IPv6 prefix begins with the IPv6 base prefix followed by the fabric identifier and terminates with zeros. For instance, the IPv6 base prefix is FD10::/16, the fabric identifier is a 16 bits integer <fabric_id>, and the generated IPv6 prefix is FD10:<fabric_id>:0:0::/64. In this case, the optional zeros consist of bits 33 to 64 of the IPv6 prefix.

A person skilled in the art of designing data center architectures would readily understand that other combinations of the IPv6 base prefix and fabric identifier may be used for generating the IPv6 prefix.

In an exemplary implementation of the method 600, the generated IPv6 prefix is a unique local address (ULA) IPv6 prefix or a public IPv6 prefix.

The method 600 comprises the step 630 of generating an IPv6 address by combining the IPv6 prefix (generated at step 625) and the host identifier (determined at step 620). This operation is well known in the art of IPv6 networking. For example, if the IPv6 prefix is a traditional/64 prefix, then the last 64 bits of the IPv6 address are generated with the host identifier. If the host identifier has less than 64 bits, zeros are appended before (or after) the host identifier to reach 64 bits.

For example, the IPv6 base prefix is a 48 bits prefix <base_prefix> (e.g. FD10:0:0/48), the fabric identifier is a 16 bits integer <fabric_id>, and the host identifier is a 48 bits integer <host_id>. The generated IPv6 address is: <base_prefix>:<fabric_id>:0:<host_id>.

The method 600 comprises the step 635 of advertising the IPv6 address generated at step 630. This operation is also well known in the art of IPv6 networking and relies on various layer 2 and/or layer 3 communication protocols. The advertising is made on one or more of the communication interfaces 530 of the computing device 500. For example, in the case of a spine switch 100, the IPv6 address is advertised on all the communication ports of the spine switch 100, only on a dedicated management port of the spine switch 100, only on the ports of the spine switch 100 connected to a leaf switch 200, etc. Similarly, in the case of a leaf switch 200, the IPv6 address is advertised on all the communication ports of the leaf switch 200, only on a dedicated management port of the leaf switch 200, only on the ports of the leaf switch 200 connected to a spine switch 100 or a controller 400, etc.

Once step 630 is completed, the computing device 500 is capable of transmitting data over the IPv6 network 20 to other computing devices. The IPv6 address generated at step 630 is used as the source IPv6 address of the IPv6 packets transmitted to the other computing devices. For example, a controller 400 transmits data to a leaf switch 200 or a spine switch 100 over the IPv6 network 20.

Once step 635 is completed, the computing device 500 is capable of receiving data over the IPv6 network 20 from other computing devices which have received the advertised IPv6 address. The IPv6 address advertised at step 635 is used as the destination IPv6 address of the IPv6 packets received from the other computing devices. For example, a controller 400 receives data from a leaf switch 200 or a spine switch 100 over the IPv6 network 20.

Steps 625, 630 and 635 of the method 600 may be repeated several times, based on the information stored in the configuration file 521. By contrast, steps 605 to 620 only need to be performed once, for generating and storing the data required by steps 625 and 630. For instance, steps 625, 630 and 635 are repeated at each boot of the computing device 500; and steps 605 to 620 are only performed at the first boot of the computing device 500 (as long as computing device 500 remains located in the same fabric).

Furthermore, the configuration file may comprise several IPv6 base prefixes. Steps 625, 630 and 635 of the method 600 are repeated for configuring (at step 630) several IPv6 addresses respectively based on one among the several IPv6 base prefixes. This enables the computing device 500 to be part of several IPv6 networks.

Link IPv6 Address

Figure 7A:
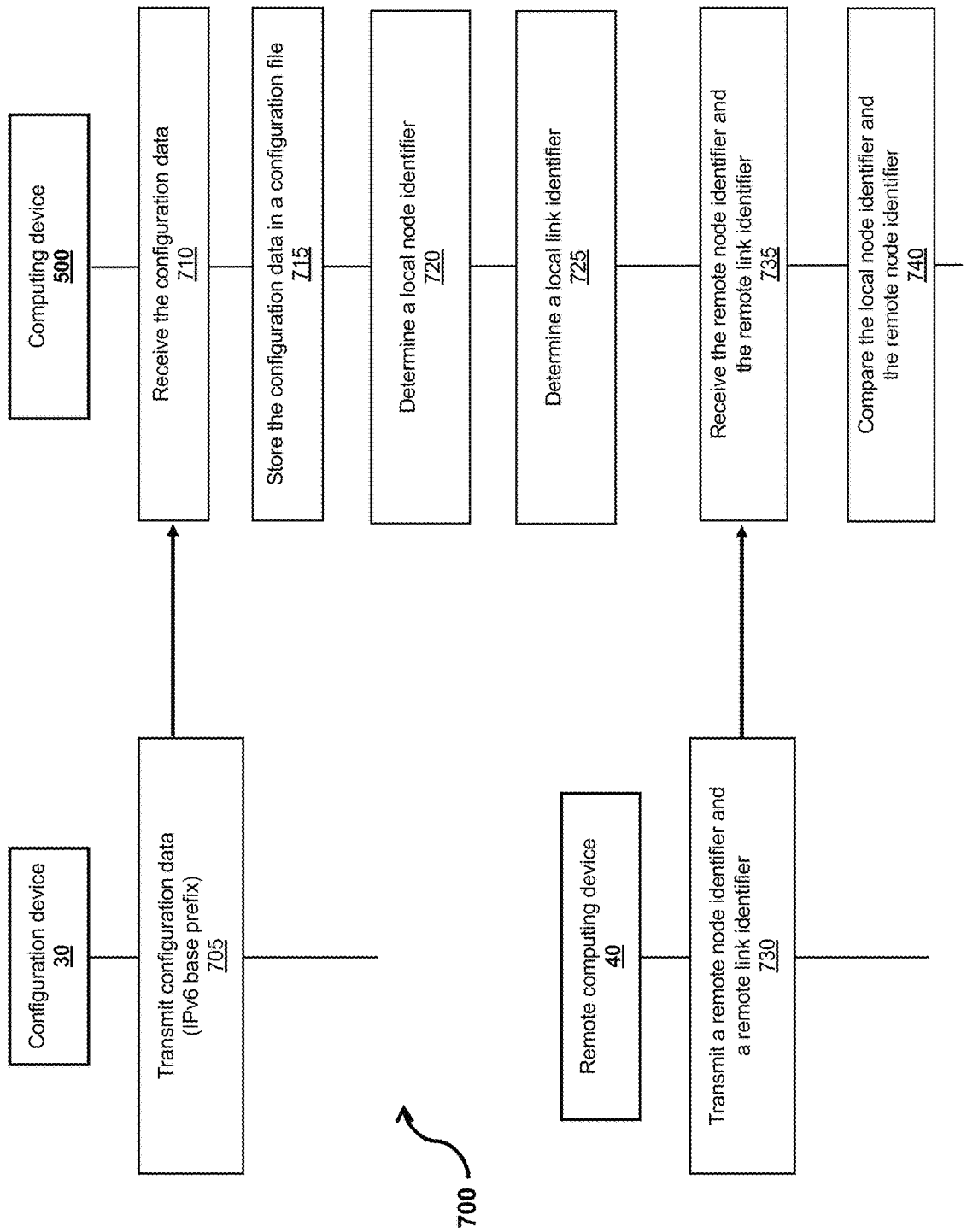
FIGS. 7A and 7B represent a method for generating a link IPv6 address.
Figure 7B:
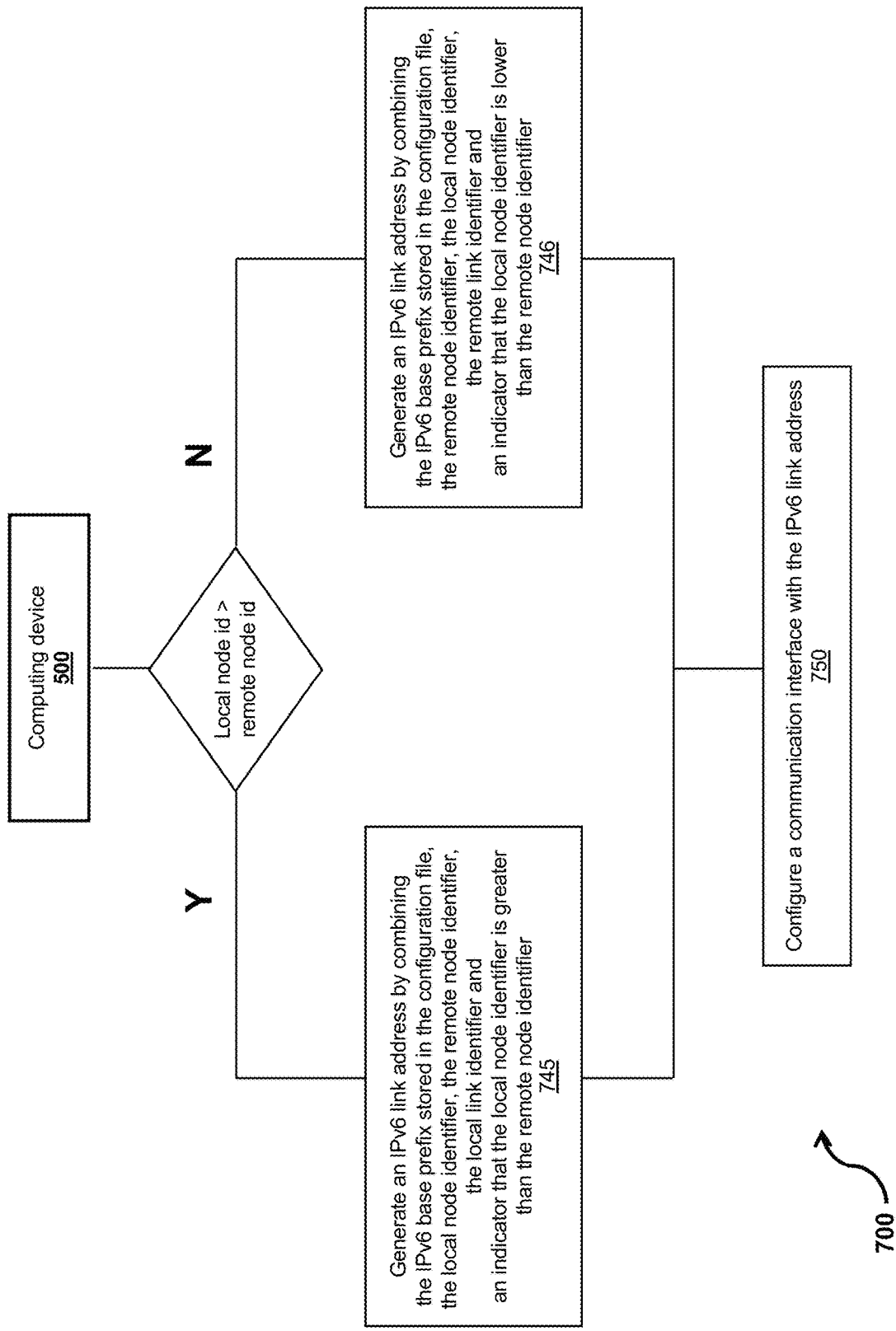

Referring now concurrently to FIGS. 3, 5, 7A and 7B, a method 700 for generating a link IPv6 address for one of the communication interfaces 530 of the computing device 500 is illustrated in FIGS. 7A and 7B. At least some of the steps of the method 700 are performed by the computing device 500 represented in FIG. 5.

A dedicated computer program has instructions for implementing at least some of the steps of the method 700. The instructions are comprised in a non-transitory computer program product (e.g. the memory 520) of the computing device 500. The instructions, when executed by the processing unit 510 of the computing device 500, provide for generating a link IPv6 address. The instructions are deliverable to the computing device 500 via an electronically-readable media such as a storage media (e.g. CD-ROM, USB key, etc.), or via communication links (e.g. via a communication network through one of the communication interfaces 530).

The communication interface 530 of the computing device 500 being configured with the link IPv6 address by the method 700 is connected to a communication interface of a remote computing device 40. The connection (e.g. physical connection via an Ethernet cable) establishes a communication link between the computing device 500 and the remote computing device 40.

The method 700 is based on node identifiers and link identifiers. The node identifier and the link identifier associated to the communication interface 530 of the computing device 500 will be referred to as the local node identifier and the local link identifier. The node identifier and the link identifier associated to the communication interface of the remote computing device 40 will be referred to as the remote node identifier and the remote link identifier.

The method 700 comprises the step 705 of transmitting configuration data by a configuration device 30 to the computing device 500.

The method 700 comprises the step 710 of receiving the configuration data by the computing device 500. The configuration data are received via one of the communication interfaces 530 of the computing device 500.

The method 700 comprises the step 715 of storing the configuration data in the configuration file 521. The configuration data comprise an IPv6 base prefix, which will be further detailed in the following steps of the method 700. For example, the IPv6 base prefix is a/16 prefix.

Steps 705, 710 and 715 are similar to steps 605, 610 and 615 of the method 600 represented in FIG. 6. As mentioned previously with respect to the method 600 represented in FIG. 6, the details of the generation and transmission of the configuration data by the configuration device 30 are out of the scope of the present disclosure.

The method 700 comprises the step 720 of determining a local node identifier for the communication interface 530 of the computing device 500. Optionally, step 720 also comprises storing the local node identifier in the configuration file 521. Step 720 is executed by the processing unit 510 of the computing device 500.

The storage of the local node identifier in the configuration file 521 is optional. Alternatively, the local node identifier is simply used at other steps of the method 700, without requiring storage of the local node identifier in a configuration file. However, it may be more efficient to determine the local node identifier only once (for instance if the determination implies calculations), and store it in the configuration file 521, so that it is used whenever needed without the need to calculate it again.

Thus, the determination of the local node identifier comprises one of the following: selecting the local node identifier, calculating the local node identifier and reading the local node identifier from the configuration file 521.

The same local node identifier is used when performing the method 700 for generating a link IPv6 address for any of the communication interfaces 530 of the computing device 500. Alternatively, different local node identifiers are determined at step 720, each one of the different local node identifiers being associated to one or more communication interfaces 530 among the plurality of communication interfaces 530 of the computing device 500.

In a first implementation, the local node identifier is a selected 48 bits integer in hexadecimal format. For example, the local node identifier is a Media Access Control (MAC) address. If the communication interfaces 530 of the computing device 500 being currently configured with the method 700 has a MAC address, then the processing unit 510 selects the MAC address of this communication interfaces 530 as the local node identifier. If the communication interfaces 530 of the computing device 500 being currently configured with the method 700 does not have its own MAC address, then the MAC address of another communication interface 530 is selected for the local node identifier. For example, equipment such as the switches (spine 100 and/or leaf 200) generally have a dedicated management interface with a MAC address which can be used for the local node identifier.

In a second implementation, the local node identifier is determined by calculating a hash of a 128 bits Universal Unique Identifier (UUID) of the computing device 500. For example, the hash of the 128 bits UUID is also a 48 bits integer in hexadecimal format. UUIDs are well known in the art. A UUID is calculated for a given computing device based on various methods (e.g. randomly, using a combination of a MAC address and a timestamp, etc.). The chances of the UUID of a given computing device being identical to the UUID of another device are very low.

The timing for performing step 720 may vary. Step 720 only needs to be performed before step 740

The local node identifier is not necessarily based on either a MAC address or an UUID. Alternatively, it is calculated based on other seed data, as long as it is unique (or at least has a very high probability of being unique).

The method 700 comprises the step 725 of determining a local link identifier for the communication interface 530 of the computing device 500. The local link identifier is associated to the communication interface 530 for which the link IPv6 address is generated by the method 700. Optionally, step 725 also comprises storing the local link identifier in the configuration file 521. Step 725 is executed by the processing unit 510 of the computing device 500.

The storage of the local link identifier in the configuration file 521 is optional. Alternatively, the local link identifier is simply used at other steps of the method 700, without requiring storage of the local link identifier in a configuration file. However, it may be more efficient to determine the local link identifier only once (for instance if the determination implies calculations), and store it in the configuration file 521, so that it can be used whenever needed without the need to calculate it again.

Thus, the determination of the local link identifier comprises one of the following: selecting the local link identifier, calculating the local link identifier and reading the local link identifier from the configuration file 521.

Each one of the communication interfaces 530 of the computing device 500 has its own local link identifier, which is different from the local link identifiers of the other communication interfaces 530.

For example, the local link identifier is a 15 bits integer in hexadecimal format. In the case of a spine switch 100 or a leaf switch 200, each port of the switch is allocated a unique integer in the range 1 to N, where N is the number of ports of the switch. The unique integer allocated to a given port is used for the local link identifier.

The determination of the local link identifier is not limited to the allocation of a unique integer in a given range of integers (e.g. 1 to N). Other techniques or algorithms can be used for determining unique local link identifiers respectively associated to the communication interfaces 530 of the computing device 500.

The method 700 comprises the step 730 of transmitting the remote node identifier and the remote link identifier by the remote computing device 40 to the computing device 500.

The method 700 comprises the step 735 of receiving the remote node identifier and the remote link identifier by the computing device 500. The remote node identifier and the remote link identifier are received via the communication interfaces 530 of the computing device 500 being currently configured with the link IPv6 address by the method 700.

For example, the remote node identifier and the remote link identifier are transmitted from the remote computing device 40 to the computing device 500 through the Link Layer Discovery Protocol (LLDP). However, other protocols than LLDP may be used for this purpose.

Optionally, the remote node identifier and the remote link identifier are also stored in the configuration file 521.

The remote node identifier and the local node identifier have the same size in bits. For example, if the local node identifier is a 48 bits integer in hexadecimal format, then the remote node identifier is also a 48 bits integer in hexadecimal format. Similarly, the remote link identifier and the local link identifier have the same size in bits. For example, if the local link identifier is a 15 bits integer in hexadecimal format, then the remote link identifier is also a 15 bits integer in hexadecimal format.

The method 700 comprises the step 740 of comparing the local node identifier and the remote node identifier. For example, the local and remote node identifiers are interpreted as integers, which are compared for determining which one of the two is greater than the other one.

If the local node identifier is greater than the remote node identifier, the method 700 performs step 745 of generating the link IPv6 address by combining the IPv6 base prefix stored in the configuration file 521, the local node identifier, the remote node identifier, the local link identifier and an indicator that the local node identifier is greater than the remote node identifier.

If the local node identifier is lower than the remote node identifier, the method 700 performs step 746 of generating the link IPv6 address by combining the IPv6 base prefix stored in the configuration file 521, the remote node identifier, the local node identifier, the remote link identifier and an indicator that the local node identifier is lower than the remote node identifier.

For example, the indicator is a Boolean which takes the value 0 if the local node identifier is greater than the remote node identifier, and the value 1 if the local node identifier is lower than the remote node identifier. Alternatively, the Boolean indicator could take the value 1 if the local node identifier is greater than the remote node identifier, and the value 0 if the local node identifier is lower than the remote node identifier.

The method 700 comprises the step 750 of configuring the communication interface 530 with the link IPv6 address generated at step 745 or 746. The configuration of a communication interface with an IPv6 address is well known in the art of IPv6 networking.

Once step 750 is completed, the computing device 500 is capable of exchanging data with the remote computing device 40 through the communication interface configured with the link IPv6 address at step 750. The link IPv6 address generated at step 745 or 746 is used as the source IPv6 address of the IPv6 packets transmitted to the remote computing device 40. The link IPv6 address generated at step 745 or 746 is used as the destination IPv6 address of the IPv6 packets received from the remote computing device 40. In order to start exchanging data, the remote computing device 40 needs to have also executed the method 700 for configuring a corresponding link IPv6 address on a corresponding communication interface of the remote computing device 40. As will be described later in relation to FIGS. 8A and 8B, the computing device 500 is capable of inferring the corresponding link IPv6 address of the remote computing device 40 based on its own link IPv6 address. Similarly, the remote computing device 40 is capable of inferring the corresponding link IPv6 address of the computing device 500 based on its own link IPv6 address.

The computing device 500 may also exchange data with other computing devices (different from computing device 40) via the communication interface configured at step 750. The link IPv6 address generated at step 745 or 746 is used as the source IPv6 address of outgoing IPv6 packets and as the destination IPv6 address of incoming IPv6 packets.

In an alternative implementation, step 745 is performed if the local node identifier is lower than the remote node identifier; and step 746 is performed if the local node identifier is greater than the remote node identifier. This alternative implementation is not represented in the Figures.

An IPv6 address is composed of 128 bits, with the first n bits generally consisting of the subnet prefix. It is common practice in IPv6 networking to reserve the 64 first bits of the IPv6 address for the subnet prefix (/64 prefix). However, the generation of the link IPv6 address by the method 700 does not follow this common practice.

The IPv6 base prefix stored in the configuration file 521 is an IPv6 prefix <base_prefix> with a length of B bits (e.g. 16 bits). The local and remote node identifiers (respectively <local_node_id> and <remote_node_id>) have a length of N bits (e.g. 48 bits). The local and remote link identifiers (respectively <local_link_id> and <remote_link_id>) have a length of L bits (e.g. 15 bits). The indicator has a length of I bits (e.g. 1 bit).

The following relationship applies: B+2*N+L+I=128.

The link IPv6 address generated by the method 700 has the following format:
<base_prefix>:<local_node_id>:<remote_node_id>:<local_link_id>:<indicator> (step 745)
or
<base_prefix>:<remote_node_id>:<local_node_id>:<remote_link_id>:<indicator> (step 746).

For instance, the IPv6 base prefix is FD04::/16. The local and remote node identifiers are 48 bits MAC addresses. The local and remote link identifiers are 15 bits identifiers consisting of the respective port numbers. The indicator is a one bit Boolean. The link IPv6 address generated by the method 700 has one of the following formats:
FD04:<local_MAC_address>:<remote_MAC_address>:<local_port_nb>:0 (step 745)
or
FD04:<remote_MAC_address>:<local_MAC_address>:<remote_port_nb>:1 (step 746).

In an exemplary implementation of the method 700, the generated link IPv6 address is a unique local address (ULA) compliant with Request for Comments (RFC) 4193 of the Internet Engineering Task Force (IETF).

The generation of the IPv6 link address at steps 745 and 746 may combine additional item(s) to those already described at step 745 and 746, as long as the generated IPv6 link address has 128 bits. For example, if shorter local and remote node identifiers are used, the IPv6 link address generate at step 745 may include the remote link identifier (e.g. <base_prefix>:<local_node_id>:<remote_node_id>:<local_link_id>:<remote_link_id>:<indicator>) and the IPv6 link address generate at step 746 may include the local link identifier (e.g. <base_prefix>:<remote_node_id>:<local_node_id>:<remote_link_id>:<local_link_id>:<indicator>).

Steps 730, 735, 740, 745 or 746, and 750 of the method 700 may be repeated several times, using the information stored in the configuration file 521. By contrast, steps 705 to 725 only need to be performed once, for generating and storing in the configuration 521 the data required by steps 730 to 750 (IPv6 base prefix, local node identifier and local link identifier). For instance, steps 730 to 750 are repeated at each boot of the computing device 500; and steps 705 to 735 are only performed at the first boot of the computing device 500.

A software-based mechanism can be implemented for triggering the computing device 500 to perform steps 730 to 750 at any time. The software-based mechanism may be implemented via a user interface of the computing device 500, via a control message received by the computing device 500, etc. For example, if the communication interface 530 of the computing device 500 which has been previously configured with the method 700 is physically or functionally connected to a new communication interface of the remote computing device 40 (or to a communication interface of a new remote computing device 40), then the software-based mechanism shall be invoked for triggering the execution of steps 730 to 750.

Figure 8A:
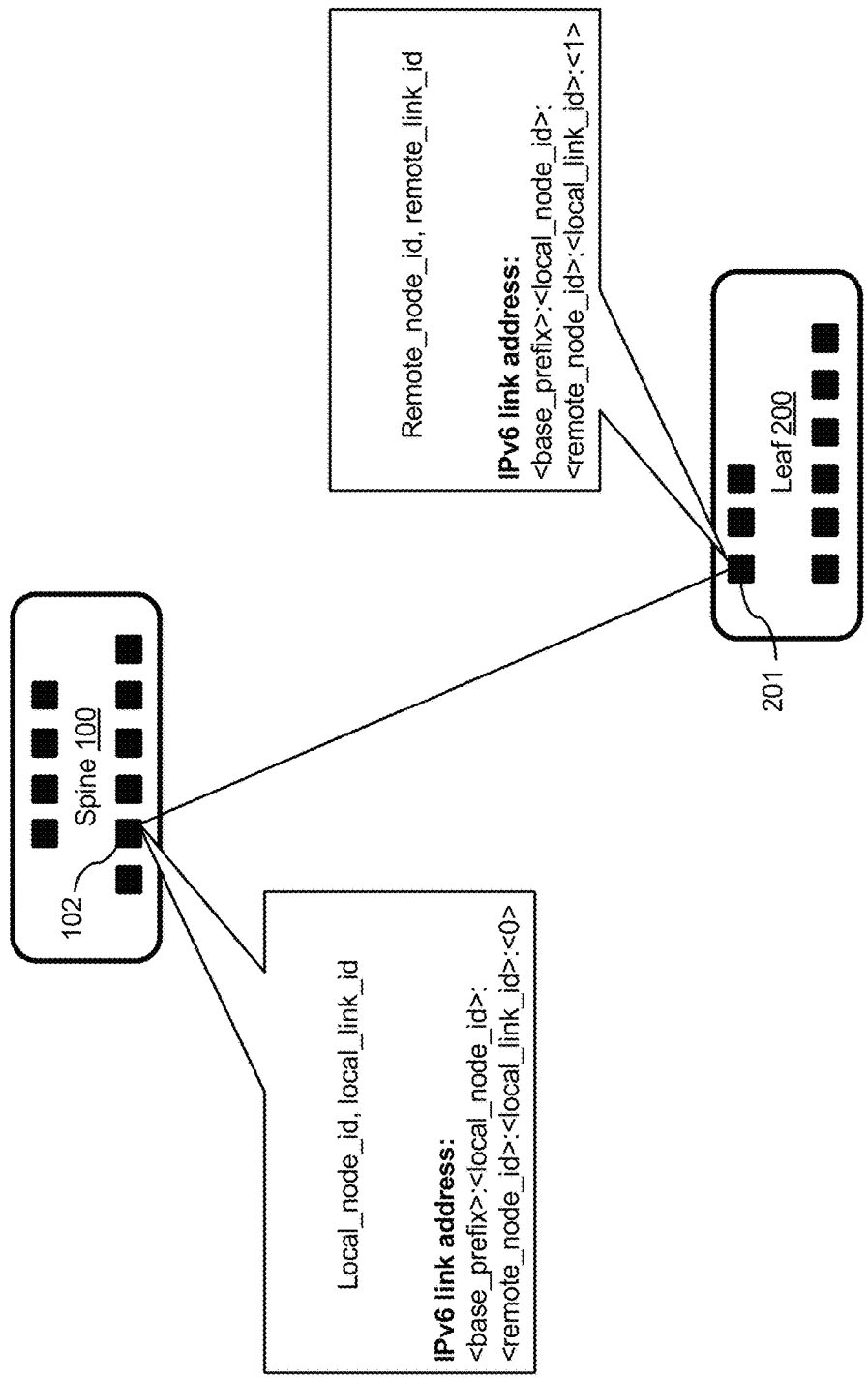
FIGS. 8A and 8B illustrate the method of FIGS. 7A and 7B applied to equipment of the fabric of FIG. 3.
Figure 8B:
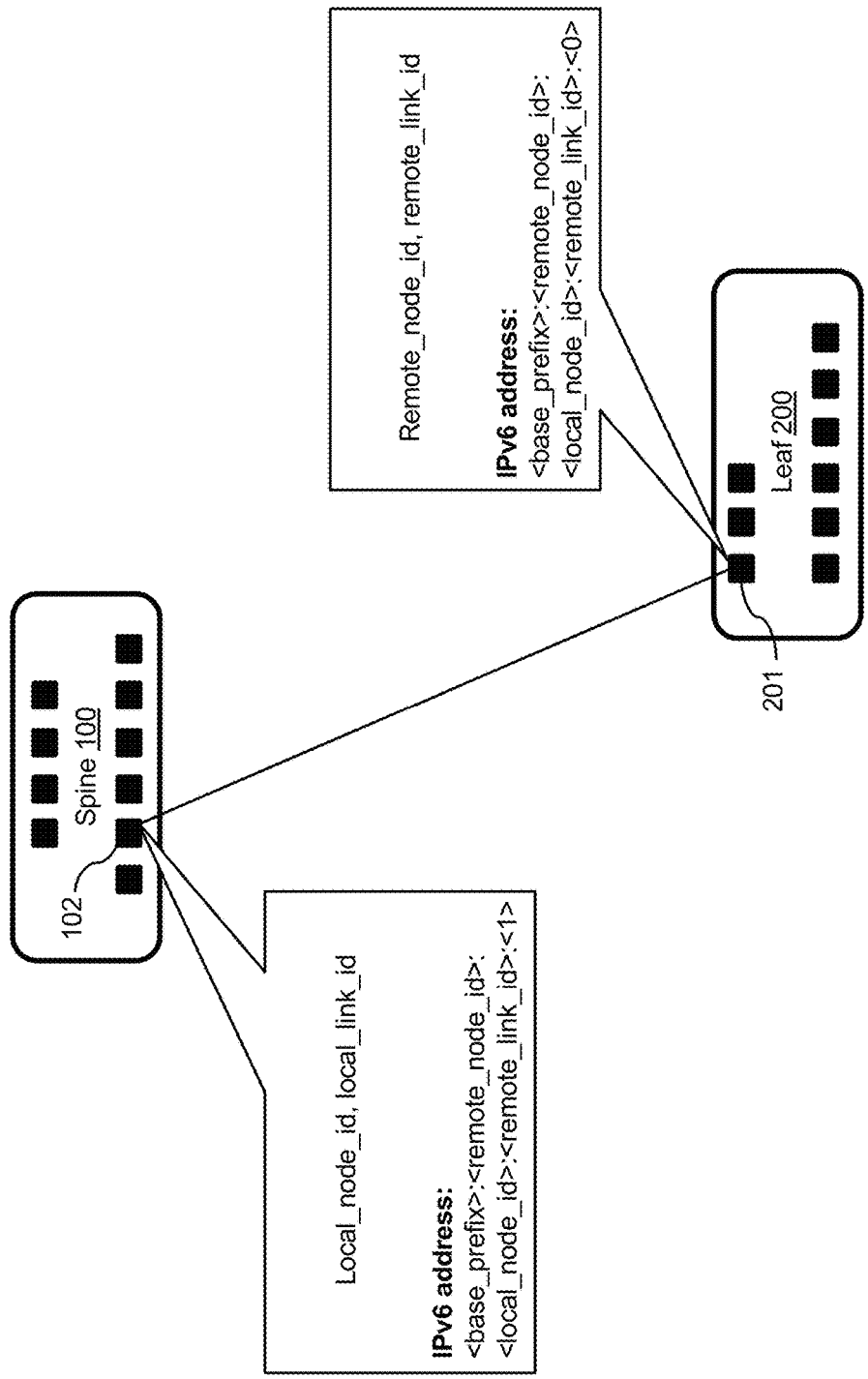

Reference is now made concurrently to FIGS. 7B, 8A and 8B, where FIGS. 8A and 8B illustrate exemplary link IPv6 addresses generated by steps 745 and 746 of the method 700.

The spine switch 100 and leaf switch 200 of FIGS. 8A and 8B respectively correspond to the computing device 500 and remote computing device 40 of FIGS. 7A and 7B. The spine switch 100 includes a port 102 connected (e.g. via an Ethernet cable) to a port 201 of the leaf switch 200. A local node identifier (local_node_id) and a local link identifier (local_link_id) are associated to port 102. Similarly, a remote node identifier (remote_node_id) and a remote link identifier (remote_link_id) are associated to port 201.

As illustrated in FIG. 8A, if the local node identifier is greater than the remote node identifier, the link IPv6 address generated at step 745 for port 102 is as follows:
<base_prefix>:<local_node_id>:<remote_node_id>:<local_link_id>:<0>.

Applying the method 700 to generate a link IPv6 address for port 201, the link IPv6 address generated at step 746 for port 201 is as follows:
<base_prefix>:<local_node_id>:<remote_node_id>:<local_link_id>:<1>.

As illustrated in FIG. 8B, if the local node identifier is lower than the remote node identifier, the link IPv6 address generated at step 746 for port 102 is as follows:
<base_prefix>:<remote_node_id>:<local_node_id>:<remote_link_id>:<1>.

Applying the method 700 to generate a link IPv6 address for port 201, the link IPv6 address generated at step 745 for port 201 is as follows:
<base_prefix>:<remote_node_id>:<local_node_id>:<remote_link_id>:<0>.

It should be noted that after executing the method 700, the spine switch 100 is capable of determining the corresponding link IPv6 address allocated to port 201 of the leaf switch 200 (when leaf switch 200 executes the method 700). More specifically, if the link IPv6 address allocated to port 102 is generated by performing step 745, then the corresponding link IPv6 address allocated to port 201 is determined by performing step 745 with an adapted value for the indicator (e.g. the value of the indicator is changed from 0 to 1 or 1 to 0). Similarly, if the link IPv6 address allocated to port 102 is generated by performing step 746, then the corresponding link IPv6 address allocated to port 201 is determined by performing step 746 with an adapted value for the indicator (e.g. the value of the indicator is changed from 0 to 1 or 1 to 0). The same property applies to the leaf switch 200 executing the method 700 and being capable of determining the corresponding link IPv6 address allocated to port 102 of the spine switch 100.

Reference is now made concurrently to FIGS. 3, 7B, 8A and 8B. FIGS. 8A and 8B are for illustration purposes only; and could be readily adapted to illustrate exemplary link IPv6 addresses generated by steps 745 and 746 of the method 700 in other configurations. The other configurations include the connection of a port of a spine switch 100 with a port of a controller 400, the connection of a port of a leaf switch 100 with a port of a controller 400, the connection of a port of a spine switch 100 with a port of another spine switch 100, and the connection of a port of a leaf switch 100 with a port of another leaf switch 100.

As mentioned previously with reference to FIG. 3, port 102 is not necessarily physically connected to port 201 (e.g. via an Ethernet cable). For example, an intermediate equipment not represented in the Figures (e.g. an intermediate switch) is used for functionally connecting port 102 to port 201. In this configuration, port 102 is directly physically connected to one port of the intermediate (switching) equipment, and port 201 is directly physically connected to another port of the intermediate (switching) equipment. In this case, several link IPv6 addresses may be generated and configured by the method 700 for port 102 of the switch spine 100. Each link IPv6 address corresponds to a functional link to a port of another equipment (having a remote node id and a remote link id). All the functional links are supported by the physical link between port 102 and the intermediate equipment.

The terminology port is used since most of the equipment of the fabric have communication interfaces in the form of ports (e.g. Ethernet electrical port, optical port, etc.). However, FIGS. 8A and 8B can be generalized to any type of communication interface, as long as the communication interface to which steps 745 and 746 of the method 700 is applied has been allocated a local node identifier and a local link identifier.

Secure Neighbor Discovery

Referring now concurrently to FIGS. 3, 5, 9A, 9B, 9C and 9D, a method 800 for performing secure neighbor discovery for one of the communication interfaces 530 of the computing device 500 is illustrated in FIGS. 9A to 9D. Some of the steps of the method 800 are performed by the computing device 500 represented in FIG. 5. Some of the steps of the method 800 are performed by a remote computing device 40 which is securely discovered by the present method 800.

A dedicated computer program has instructions for implementing the steps of the method 800 executed on the computing device 500. The instructions are comprised in a non-transitory computer program product (e.g. the memory 520) of the computing device 500. The instructions, when executed by the processing unit 510 of the computing device 500, provide for performing a secure neighbor discovery. The instructions are deliverable to the computing device 500 via an electronically-readable media such as a storage media (e.g. CD-ROM, USB key, etc.), or via communication links (e.g. via a communication network through one of the communication interfaces 530).

The remote computing device 40 is similar to the computing device 500 represented in FIG. 5. The remote computing device 40 comprises a processing unit, memory and at least one communication interface.

A dedicated computer program has instructions for implementing the steps of the method 800 executed on the remote computing device 40. The instructions are comprised in a non-transitory computer program product (e.g. the memory) of the remote computing device 40. The instructions, when executed by the processing unit of the remote computing device 40, provide for performing a secure neighbor discovery. The instructions are deliverable to the remote computing device 40 via an electronically-readable media such as a storage media (e.g. CD-ROM, USB key, etc.), or via communication links (e.g. via a communication network through one of the communication interfaces of the remote computing device 40).

The communication interface 530 of the computing device 500 for which the secure discovery is performed is connected to a communication interface of the remote computing device 40. The connection (e.g. physical connection via an Ethernet cable) establishes a communication link between the computing device 500 and the remote computing device 40.

The method 800 is based on node identifiers and challenges. The node identifier and challenges associated to the communication interface 530 of the computing device 500 will be referred to as the local node identifier and the local challenges. The node identifier and the challenges associated to the communication interface of the remote computing device 40 will be referred to as the remote node identifier and the remote challenges.

The method 800 comprises the step 805 of determining a local node identifier for the communication interface 530 of the computing device 500. Step 805 is executed by the processing unit 510 of the computing device 500.

The determination of the local node identifier has been previously described in relation to the method 700 represented in FIG. 7A. In an exemplary implementation, the local node identifier is the MAC address of the communication interface 530 of the computing device 500 for which the secure neighbor discovery is performed. Alternatively, the local node identifier is the MAC address of another communication interface 530 of the computing device 500. In another exemplary implementation, the local node identifier is determined by calculating a hash of a 128 bits Universal Unique Identifier (UUID) of the computing device 500.

The method 800 comprises the step 810 of generating a local challenge. Step 810 is executed by the processing unit 510 of the computing device 500. The generation of the challenges used by the method 800 will be detailed later in the description.

The method 800 comprises the step 815 of encrypting the local node identifier into an encrypted local node identifier. Step 815 is executed by the processing unit 510 of the computing device 500. The encryption/decryption means used by the method 800 will be detailed later in the description.

The method 800 comprises the step 820 of encrypting the local challenge into an encrypted local challenge. Step 820 is executed by the processing unit 510 of the computing device 500.

The method 800 comprises the step 825 of transmitting via the communication interface 530 a discovery request message comprising the encrypted local node identifier and the encrypted local challenge. Step 825 is executed by the processing unit 510 of the computing device 500. The messages exchanged between the computing device 500 and the remote computing device 40 when performing the method 800 will be detailed later in the description.

The method 800 comprises the step 830 of receiving via the communication interface of the remote computing device 40 the discovery request message. Step 830 is executed by the processing unit of the remote computing device 40.

The method 800 comprises the step 835 of decrypting the encrypted local node identifier into the local node identifier. Step 835 is executed by the processing unit of the remote computing device 40.

The method 800 comprises the step 840 of decrypting the encrypted local challenge into the local challenge. Step 840 is executed by the processing unit of the remote computing device 40.

The method 800 comprises the step 845 of generating a local challenge response based at least on the local challenge received at step 830 in an encrypted form. Step 845 is executed by the processing unit of the remote computing device 40. The generation of the challenge responses used by the method 800 will be detailed later in the description.

The method 800 comprises the step 850 of determining a remote node identifier for the communication interface of the remote computing device 40. Step 850 is executed by the processing unit of the remote computing device 40. The determination of the remote node identifier is similar to the determination of the local node identifier at step 805.

The method 800 comprises the step 855 of encrypting the remote node identifier into an encrypted remote node identifier. Step 885 is executed by the processing unit of the remote computing device 40.

The method 800 comprises the step 860 of encrypting the local challenge response into an encrypted local challenge response. Step 860 is executed by the processing unit of the remote computing device 40.

The method 800 comprises the step 865 of generating a remote challenge. Step 865 is executed by the processing unit of the remote computing device 40.

The method 800 comprises the step 870 of encrypting the remote challenge into an encrypted remote challenge. Step 870 is executed by the processing unit of the remote computing device 40.

The method 800 comprises the step 875 of transmitting to the computing device 500 via the communication interface of the remote computing device 40 a discovery response message. The discovery response message comprises the encrypted remote node identifier, the encrypted local challenge response and the encrypted remote challenge. Step 875 is executed by the processing unit of the remote computing device 40.

The method 800 comprises the step 880 of receiving from the remote computing device 40 via the communication interface 530 of the computing device 500 the discovery response message. Step 880 is executed by the processing unit 510 of the computing device 500.

Steps 865 and 870 are optional. Thus, in a first implementation, the discovery response message comprises the encrypted remote node identifier, the encrypted local challenge response and the encrypted remote challenge. In another implementation, the discovery response message only comprises the encrypted remote node identifier and the encrypted local challenge response.

The method 800 comprises the step 885 of decrypting the encrypted local challenge response into the local challenge response. Step 885 is executed by the processing unit 510 of the computing device 500.

The method 800 comprises the step 890 of generating an expected local challenge response based at least on the local challenge. Step 890 is executed by the processing unit 510 of the computing device 500. The generation of the expected local challenge response shall be based on the same mechanism as the generation of the local challenge response at step 845.

The method 800 comprises the step 895 of determining that the local challenge response (received in an encrypted form at step 880) corresponds to the expected local challenge response (generated at step 890). Step 895 is executed by the processing unit 510 of the computing device 500.

If the local challenge response (received in an encrypted form at step 880) matches the expected local challenge response (generated at step 890), the secure discovery of the remote computing device 40 by the computing device 500 is a success. The remote computing device 40 is considered by the computing device 500 to be a legit device, having the proper credentials for successfully passing the secure discovery procedure.

If the local challenge response (received in an encrypted form at step 880) does not match the expected local challenge response (generated at step 890), the secure discovery of the remote computing device 40 by the computing device 500 is a failure. The remote computing device 40 is considered by the computing device 500 to be a rogue device, since it does not possess the proper credentials for successfully passing the secure discovery procedure.

The following steps of the method 800 are only performed if the secure discovery of the remote computing device 40 is a success.

The method 800 comprises the step 900 of decrypting the encrypted remote node identifier into the remote node identifier. Step 900 is executed by the processing unit 510 of the computing device 500.

The following steps of the method 800 are optional. The following steps are only performed if the discovery response message received at step 880 comprises the encrypted remote challenge.

The method 800 comprises the step 905 of decrypting the encrypted remote challenge into the remote challenge. Step 905 is executed by the processing unit 510 of the computing device 500.

The method 800 comprises the step 910 of generating a remote challenge response based at least on the remote challenge received at step 880 in an encrypted form. Step 910 is executed by the processing unit 510 of the computing device 500.

The method 800 comprises the step 915 of encrypting the remote challenge response into an encrypted remote challenge response. Step 915 is executed by the processing unit 510 of the computing device 500.

The method 800 comprises the step 920 of transmitting via the communication interface 530 a discovery acknowledgement message comprising the encrypted remote challenge response. Step 920 is executed by the processing unit 510 of the computing device 500.

The method 800 comprises the step 925 of receiving via the communication interface of the remote computing device 40 the discovery acknowledgement message. Step 925 is executed by the processing unit of the remote computing device 40.

The method 800 comprises the step 930 of decrypting the encrypted remote challenge response into the remote challenge response. Step 925 is executed by the processing unit of the remote computing device 40.

The method 800 comprises the step 935 of generating an expected remote challenge response based at least on the remote challenge. Step 935 is executed by the processing unit of the remote computing device 40. The generation of the expected remote challenge response shall be based on the same mechanism as the generation of the remote challenge response at step 910.

The method 800 comprises the step 940 of determining that the remote challenge response (received in an encrypted form at step 925) corresponds to the expected remote challenge response (generated at step 935). Step 940 is executed by the processing unit of the remote computing device 40.

If the remote challenge response (received in an encrypted form at step 925) matches the expected remote challenge response (generated at step 935), the secure discovery of the computing device 500 by the remote computing device 40 is a success. The computing device 500 is considered by the remote computing device 40 to be a legit device, having the proper credentials for successfully passing the secure discovery procedure.

If the remote challenge response (received in an encrypted form at step 925) does not match the expected remote challenge response (generated at step 935), the secure discovery of the computing device 500 by the remote computing device 40 is a failure. The computing device 500 is considered by the remote computing device 40 to be a rogue device, since it does not possess the proper credentials for successfully passing the secure discovery procedure.

Various encryption/decryption methods well known in the art can be used for encrypting/decrypting the node identifiers and the challenges. For example, a shared key is used by the computing device 500 and the remote computing device 40. As is well known in the art, the shared key is used both for the encryption and decryption operations. The shared key is comprised in the configuration file 521 stored in the memory 520 of the computing device 500. The remote computing device 50 has a similar configuration file stored in its memory and comprising the shared key. As illustrated in FIG. 6 (step 605 of the method 600), the shared key is transferred from a configuration device 30 to the computing device 500 (and remote computing device 40) for storage in the configuration file 521. The same shared key is used for all encryption/decryption operations. Alternatively, different share keys are used. For instance, a first shared key is used for encrypting/decrypting the node identifiers, and a second shared key is used for encrypting/decrypting the challenges. Instead of a shared key, pairs of public/private keys can be used. However, the deployment of pairs of public/private keys for securing transactions between a plurality of nodes is more complex. The computing device 500 needs to store its own private key for encrypting data (local node identifier, local challenge, etc.) sent to the remote computing device 40. The computing device 500 also needs to store the public key of the remote computing device 40 for decrypting data (remote node identifier, local challenge response, etc.) received from the remote computing device 40. Similarly, the remote computing device 40 needs to store its own private key for encrypting data (remote node identifier, local challenge response, etc.) sent to the computing device 500. The remote computing device 40 also needs to store the public key of the computing device 500 for decrypting data (local node identifier, local challenge, etc.) received from the computing device 500. The previously described encryption/decryption methods are for illustration purposes only. Other methods could be used.

Various methods can be used for generating the challenges and responses to challenges. In a first exemplary implementation, the local and remote challenges are random numbers generated by a random number generator. In a second exemplary implementation, the local and remote challenges are generated by a mathematical function taking as inputs one or more seeds. Examples of seeds include the current time, a characteristic of the computing device 500 (or remote computing device 40), etc. In a third exemplary implementation, the local and remote challenges are selected among a pre-defined list of values stored in the configuration file 521. The selection may be random, sequential, etc.

With respect to the local challenge response and the expected local challenge response, they need to be generated based on the local challenge for securing the discovery process. More specifically, this ensures that the remote computing device 40 is legit, since it was able to decrypt the received encrypted local challenge with the proper encryption material, to generate the local challenge response using the local challenge in the generation process, and to encrypt the local challenge response with the proper encryption material. In a first exemplary implementation, the local challenge response is generated by a mathematical function taking the local challenge as a seed. Additional seed(s) can also be used in addition to the local challenge (e.g. the local node identifier and/or the remote node identifier). In a second exemplary implementation, the local challenge response is selected among a pre-defined list of values stored in the configuration file 521. This only works if the local challenge was also selected among a pre-defined list of values stored in the configuration file 521. Each pre-defined value of the local challenge is associated to a corresponding pre-defined value of the local challenge response. Upon reception of one of the pre-defined values of the local challenge, the corresponding pre-defined value is selected for the local challenge response. The same mechanisms are implemented for the remote challenge response and the expected remote challenge response. The previously described methods for generating the challenges and responses to challenges are for illustration purposes only. Other methods could be used.

Various protocols can be used for implementing the discovery, discovery response and discovery acknowledgement messages. For example, the Link Layer Discovery Protocol (LLDP) specified in Institute of Electrical and Electronics Engineers (IEEE) 802.1AB and IEEE 802.3-2012 section 6 clause 79 is used. An LLDP frame comprises mandatory Type-Length-Values (TLVs) and zero or more optional TLV. The data (e.g. encrypted node identifiers, encrypted challenges, etc.) exchanged by the method 800 between the computing device 500 and the computing device 40 are transported in existing optional TLVs if applicable. Alternatively, new dedicated optional TLV(s) are defined for implementing the method 800. Since there is no notion of request, response and acknowledgement in LLDP, each one of the discovery, discovery response and discovery acknowledgement messages is implemented by a unidirectional LLDP message.

The previously described protocol for implementing the discovery, discovery response and discovery acknowledgement messages is for illustration purposes only. Other standardized (or proprietary) protocols could be used. In particular, a protocol which supports the notion of request, response and acknowledgement could be used.

The discovery request message is transmitted in a multicast or broadcast mode, at the layer 2 (e.g. data link layer based on Ethernet) or layer 3 (e.g. network layer based on IP) of the Open Systems Interconnection (OSI) model. For example, if LLDP is used, the destination MAC address is a multicast MAC address. Since the computing device 500 does not know the neighbor(s) to be discovered (remote computing device(s) 40), it does not know their destination MAC (or IP) address. Thus, a multicast or broadcast destination address is used to reach the neighbor(s) via the discovery request message. The discovery response and discovery acknowledgement messages are also transmitted in a multicast or broadcast mode. Alternatively, unicast destination addresses are used: the source address of the discovery request message is used as the destination address of the discovery response message and the source address of the discovery response message is used as the destination address of the discovery acknowledgement message.

The secure discovery procedure supported by the method 800 may be implemented in different ways. In a first implementation, a mutual secure discovery of the computing device 500 and remote computing device 40 is performed by executing all the steps of the method 800. The computing device 500 securely advertises its node identifier (and optionally link identifier) to the remote computing device 40. In return, the remote computing device 40 securely advertises its node identifier (and optionally link identifier) to the computing device 500.

In a second implementation, no mutual secure discovery is performed, but rather two independent secure discoveries. The computing device 500 and the remote computing device 40 only execute steps 810, 820, 825, 830, 840 to 861, 875 and 880 to 901 of the method 800, for performing the secure discovery of the remote computing device 40 by the computing device 500. The same procedure is used by the remote computing device 40 for discovering the computing device 500.

Additional data may be exchanged (in plain or encrypted form) between the computing device 500 and the remote computing device 40 during the secure discovery procedure. For example, in addition to the local node identifier, the computing device 500 determines a local link identifier. The local link identifier is transmitted to the remote computing device 40 in an encrypted or plain form, via the discovery request message (or alternatively via the discovery acknowledgement message). Similarly, in addition to the remote node identifier, the remote computing device 40 determines a remote link identifier. The remote link identifier is transmitted to the computing device 500 in an encrypted or plain form, via the discovery response message.

FIG. 9A represents the optional steps 806 of determining the local link identifier and 816 of encrypting the local link identifier. In this case, although not represented in FIG. 9A for simplification purposes, the discovery request message of steps 825 and 830 further comprises the encrypted local link identifier.

Figure 9B:
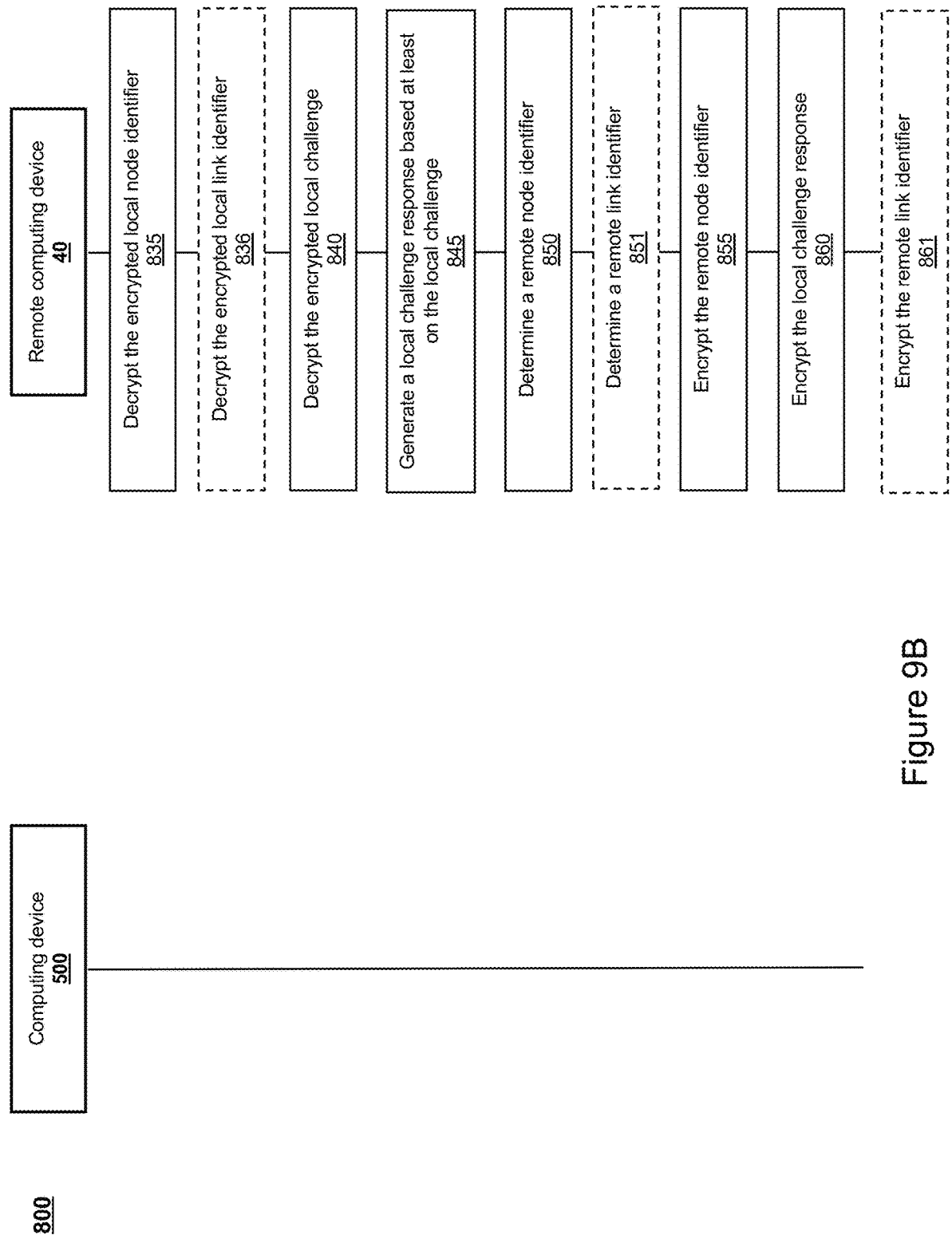
Figure 9D:
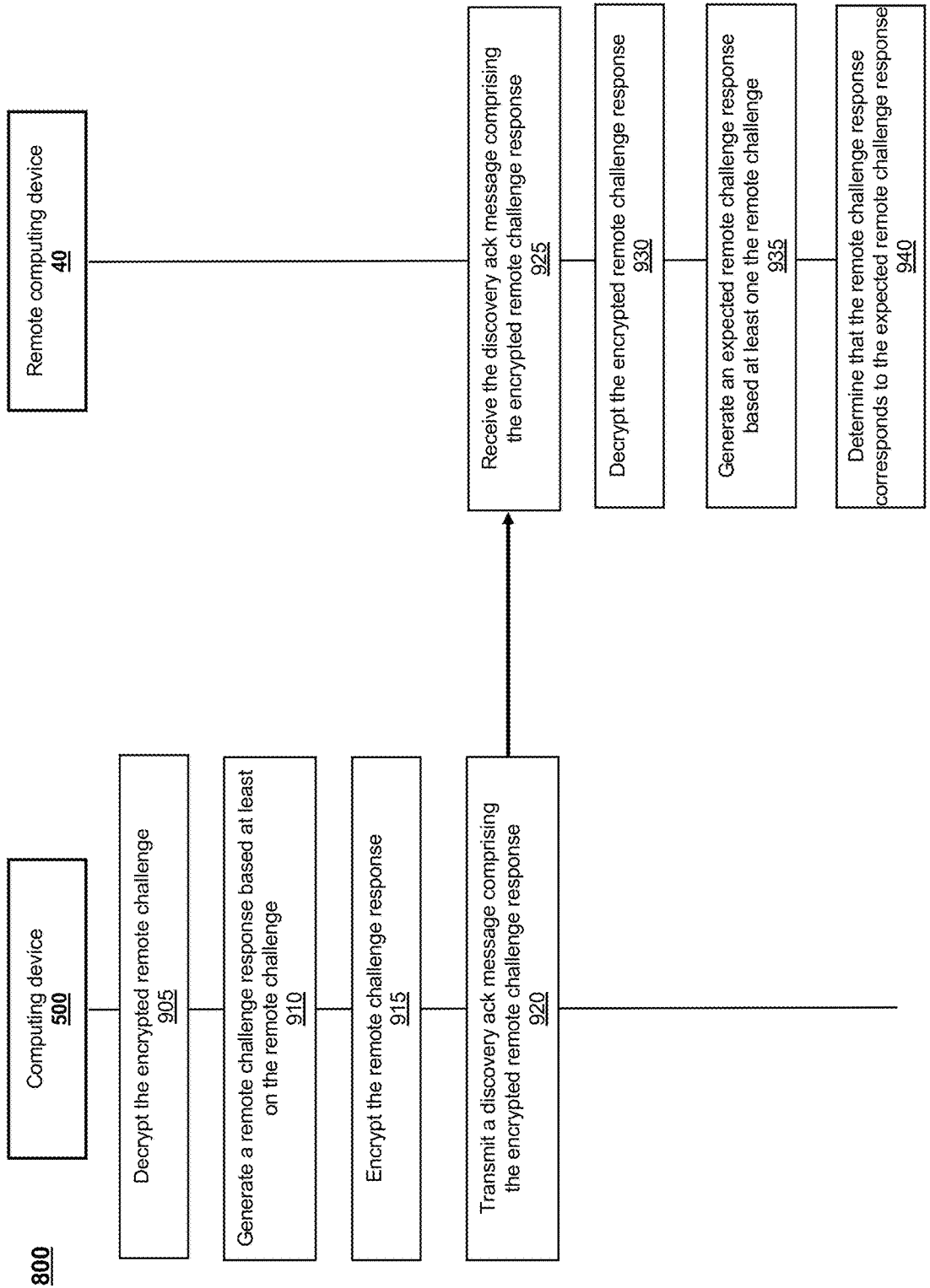

FIG. 9B represents the optional steps 836 of decrypting the local link identifier, 851 of determining the remote link identifier and 861 of encrypting remote local link identifier.

FIG. 9C represents the optional steps 901 of decrypting the remote link identifier. Although not represented in FIG. 9C for simplification purposes, the discovery response message of steps 875 and 880 further comprises the encrypted remote link identifier.

The determination of the local link identifier has been previously described in relation to the method 700 represented in FIG. 7A. In an exemplary implementation, the local link identifier is a 15 bits integer in hexadecimal format associated to the communication interface 530 of the computing device 500 for which the secure neighbor discovery is performed. In the case of a spine switch 100 or a leaf switch 200, each port of the switch is allocated a unique integer in the range 1 to N, where N is the number of ports of the switch. The unique integer allocated to a given port is used for the local link identifier. The determination of the remote link identifier is similar to the determination of the local link identifier.

Alternatively, the computing device 500 and the remote computing device 40 do not respectively determine and transmit (in encrypted form) the local and remote node identifiers. Instead, other data are generated at the local computing device 500 and/or remote computing device 40. The other data are transmitted in plain or encrypted form, via one of the discovery request message, discovery response message or the discovery acknowledgement message.

In an alternative implementation (not represented in the Figures for simplification purposes), at least some of the steps 815, 816 and 820 are combined. For example, a combination of the local node identifier and the local challenge is encrypted; or a combination of the local node identifier, the local link identifier and the local challenge is encrypted.

Similarly, at least some of the steps 835, 836 and 840 are combined. For example, an encrypted combination of the local node identifier and the local challenge is decrypted into the local node identifier and the local challenge; or an encrypted combination of the local node identifier, the local link identifier and the local challenge is decrypted into the local node identifier, the local link identifier and the local challenge.

Similarly, at least some of the steps 855, 860, 861 and 870 are combined. For example, a combination of the remote node identifier, the local challenge response and the remote challenge is encrypted; or a combination of the remote node identifier, the remote link identifier, the local challenge response and the remote challenge is encrypted.

Figure 10:
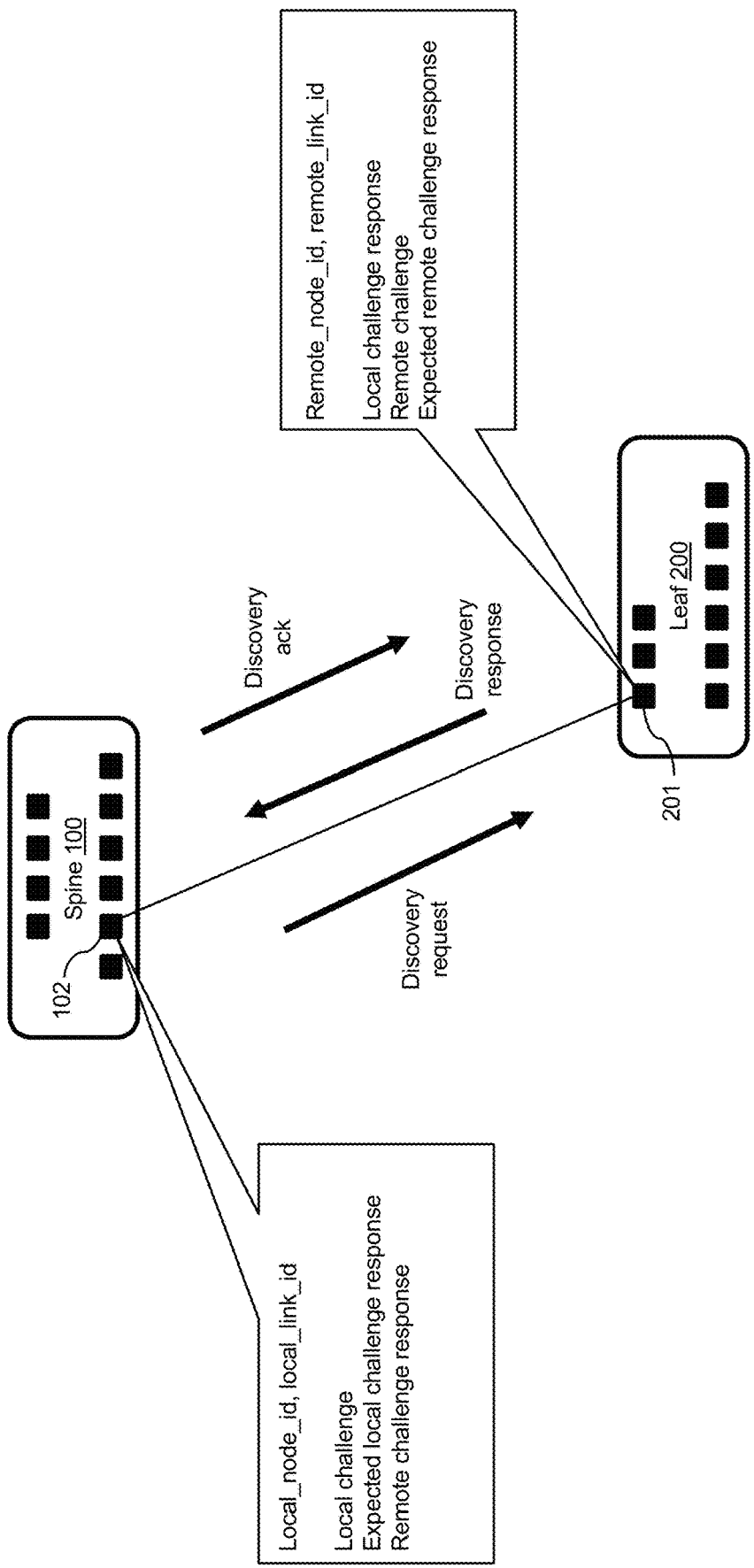
FIG. 10 illustrates the method of FIGS. 9A-D applied to equipment of the fabric of FIG. 3.

Reference is now made concurrently to FIGS. 9A-D and 10, where FIG. 10 illustrates the neighbor discovery procedure supported by the method 800.

The spine switch 100 and leaf switch 200 of FIG. 10 respectively correspond to the computing device 500 and remote computing device 40 of FIGS. 9A-D. The spine switch 100 includes a port 102 connected (e.g. via an Ethernet cable) to a port 201 of the leaf switch 200. A local node identifier (local_node_id) and a local link identifier (local_link_id) are associated to port 102. Similarly, a remote node identifier (remote_node_id) and a remote link identifier (remote_link_id) are associated to port 201. Furthermore, the spine 100 generates the local challenge, the expected local challenge response and the remote challenge response; while the leaf 200 generates the local challenge response, the remote challenge and the expected remote challenge response. The discovery request, discovery response and discovery acknowledgement messages exchanged between the spine 100 and the leaf 200 are further represented.

Figure 11A:
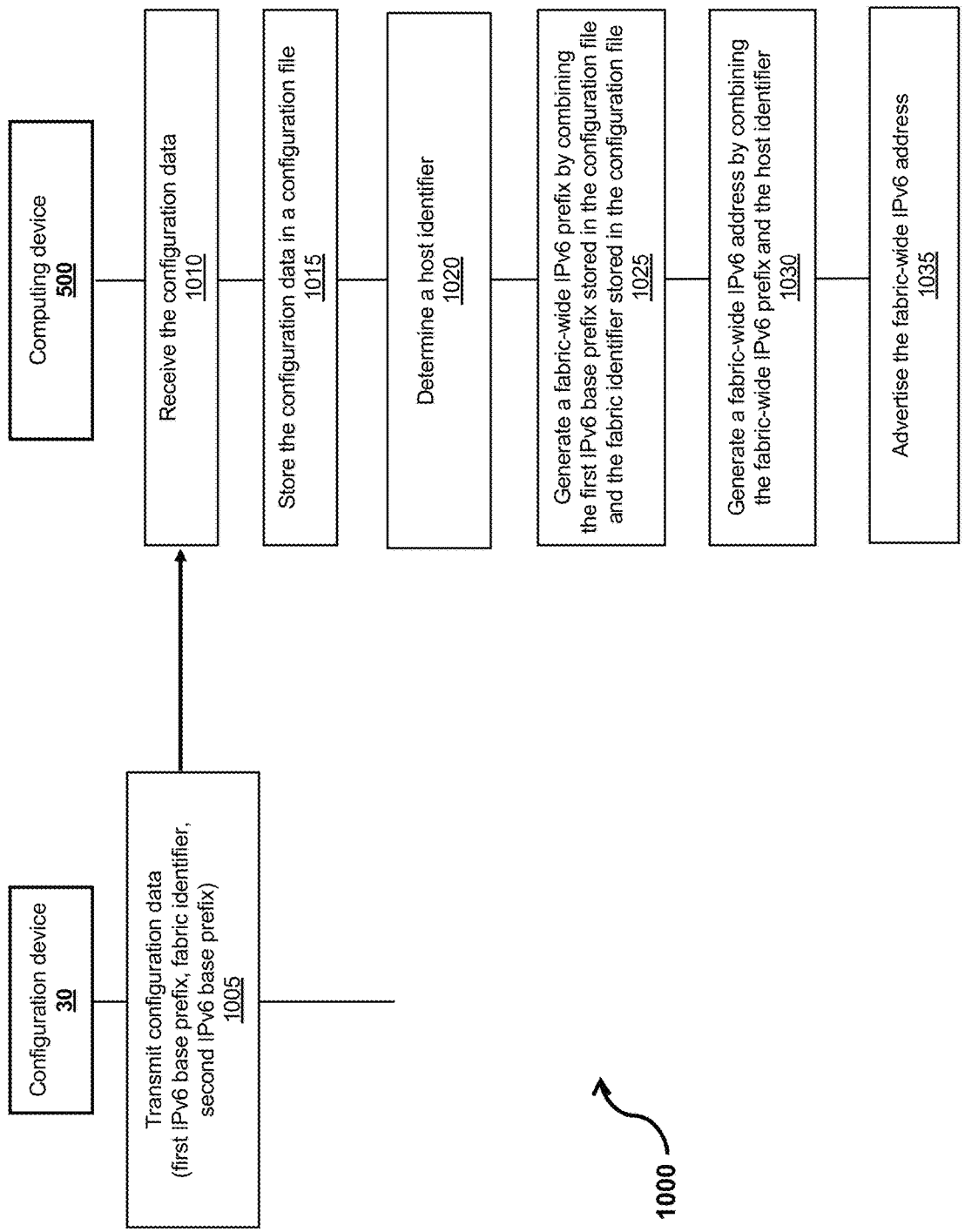
FIGS. 11A, 11B and 11C represent a method for performing a network configuration by combining the methods of FIGS. 6, 9A-D and 7A-B.
Figure 11B:
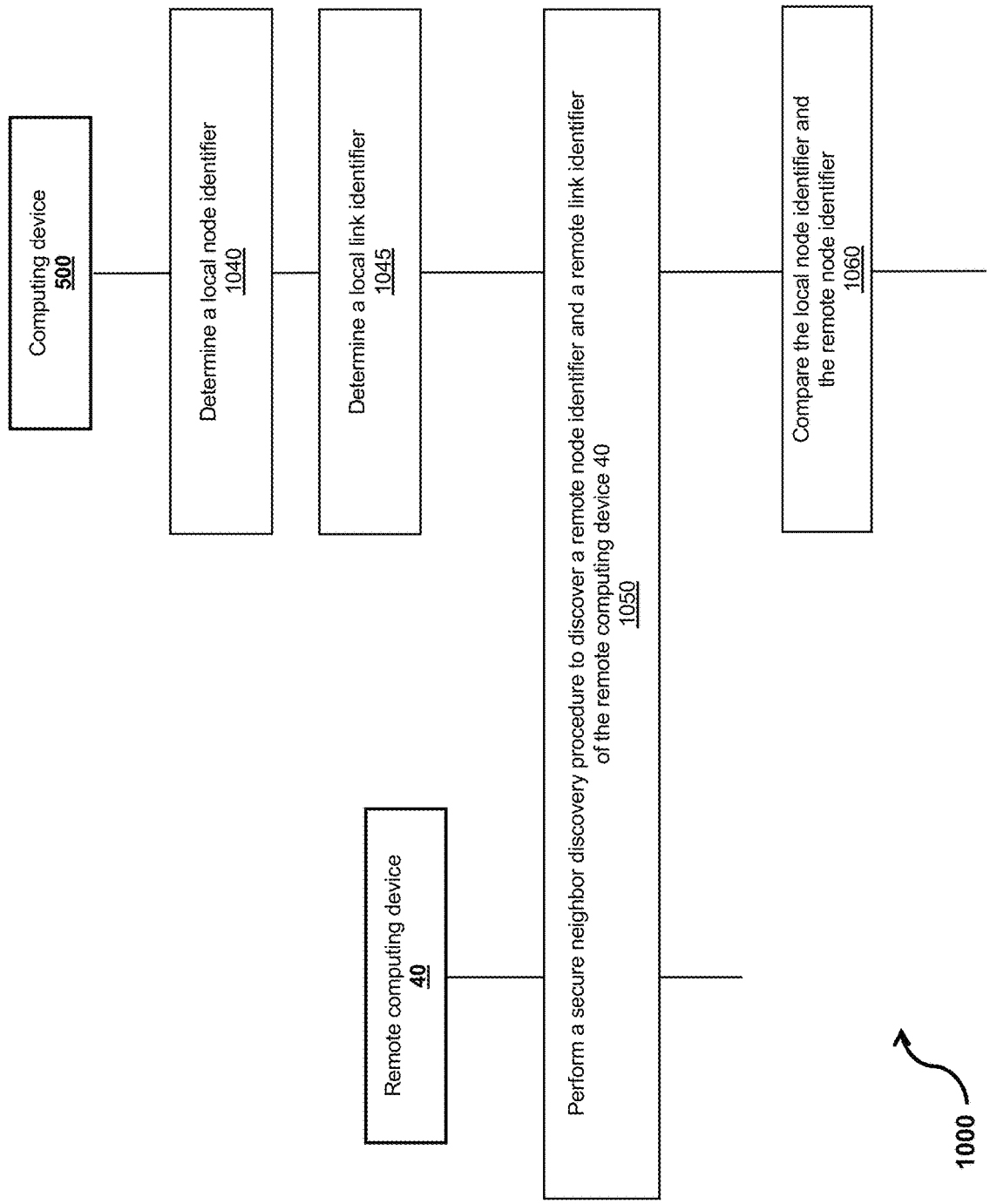
Figure 11C:
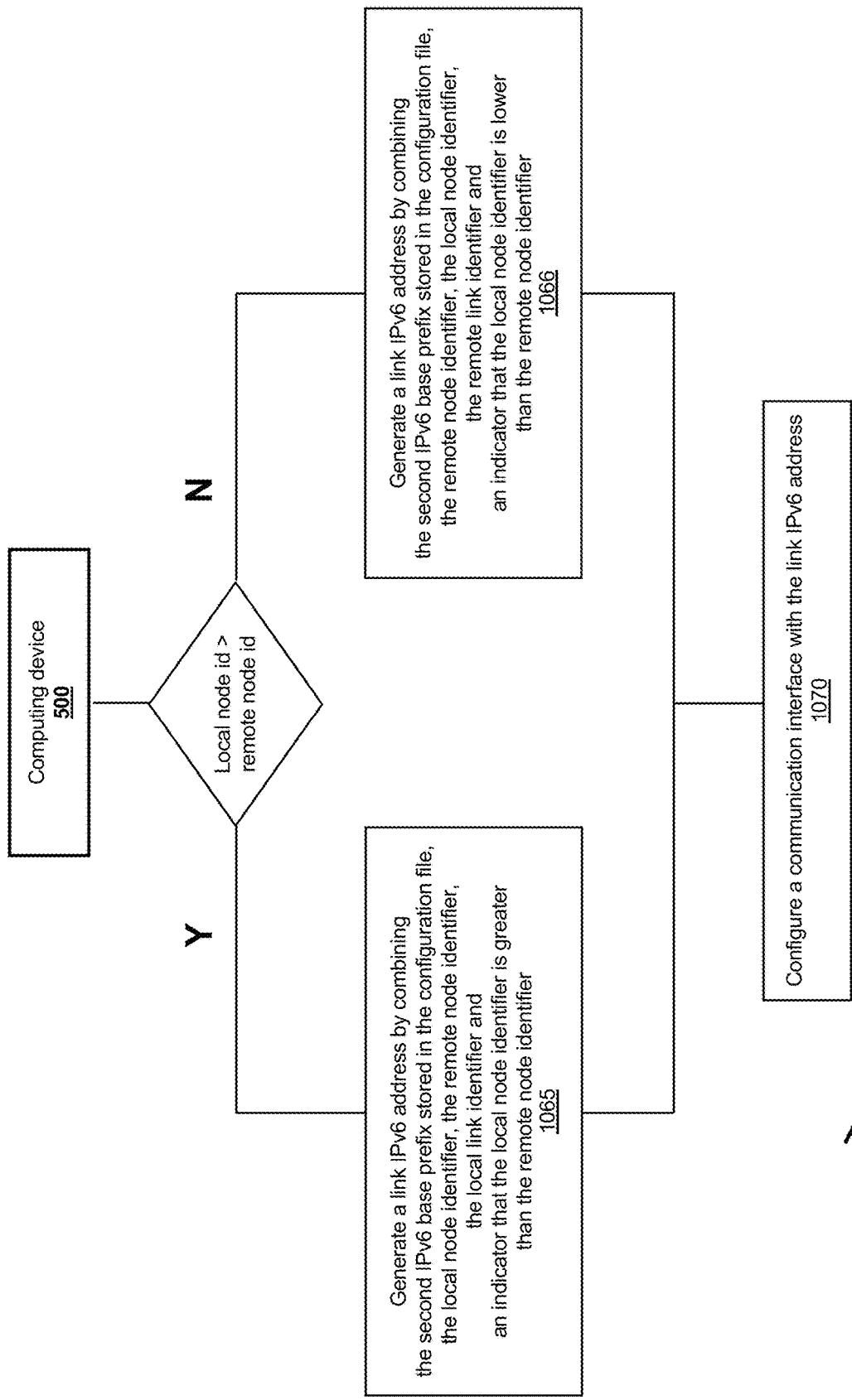

Network Configuration Including the Generation of a Fabric-Wide IPv6 Address, the Secure Neighbor Discovery and the Generation of One or More Link IPv6 Address Referring now concurrently to FIGS. 3, 5, 6, 7A-B, 9A-D and 11A, 11B and 11C, a method 1000 for performing a network configuration of the computing device 500 is illustrated in FIGS. 11A, 11B and 11C. At least some of the steps of the method 1000 are performed by the computing device 500 represented in FIG. 5.

The network configuration includes the generation of a fabric-wide IPv6 address described in the method 600 illustrated in FIG. 6. The network configuration also includes the secure neighbor discovery described in the method 800 illustrated in FIGS. 9A, 9B, 9C and 9D. The network configuration further includes the generation of the link IPv6 address described in the method 700 illustrated in FIGS. 7A and 7B. The neighbor discovery procedure allows the secure discovery of the remote node identifier and the remote link identifier of the remote computing device 40, which are used for the generation of the link IPv6 address. The neighbor discovery procedure also allows the secure transmission of the local node identifier and the local link identifier to the remote computing device 40, which are used for the generation of a corresponding link IPv6 address at the remote computing device 40.

Several communication interfaces 530 of the computing device 500 can be configured with a link IPv6 address through the secure neighbor discovery procedure by repeating the steps of the methods 800 and 700 for each communication interface 530.

A dedicated computer program has instructions for implementing at least some of the steps of the method 1000. The instructions are comprised in a non-transitory computer program product (e.g. the memory 520) of the computing device 500. The instructions, when executed by the processing unit 510 of the computing device 500, provide for performing a network configuration of the computing device 500. The instructions are deliverable to the computing device 500 via an electronically-readable media such as a storage media (e.g. CD-ROM, USB key, etc.), or via communication links (e.g. via a communication network through one of the communication interfaces 530).

The method 1000 comprises the step 1005 of transmitting configuration data by the configuration device 30 to the computing device 500. Step 1005 corresponds to step 605 of the method 600 and step 705 of the method 700.

The method 1000 comprises the step 1010 of receiving the configuration data by the computing device 500. The configuration data are received via one of the communication interfaces 530 of the computing device 500. Step 1010 corresponds to step 610 of the method 600 and step 710 of the method 700.

The method 1000 comprises the step 1015 of storing the configuration data in the configuration file 521. Step 1015 corresponds to step 615 of the method 600 and step 715 of the method 700. The configuration data comprise a first IPv6 base prefix, a fabric identifier, and a second IPv6 base prefix.

The method 1000 comprises the step 1020 of determining a host identifier and optionally storing the host identifier in the configuration file 521. Step 1020 corresponds to step 620 of the method 600.

The method 1000 comprises the step 1025 of generating a fabric-wide IPv6 prefix by combining the first IPv6 base prefix stored in the configuration file 521 and the fabric identifier stored in the configuration file 521. Step 1025 corresponds to step 625 of the method 600.

The method 1000 comprises the step 1030 of generating a fabric-wide IPv6 address by combining the fabric-wide IPv6 prefix (generated at step 1025) and the host identifier (determined at step 1020). Step 1030 corresponds to step 630 of the method 600.

The method 1000 comprises the step 1035 of advertising the fabric-wide IPv6 address generated at step 1030. Step 1035 corresponds to step 635 of the method 600.

The method 1000 comprises the step 1040 of determining a local node identifier of the computing device 500; and optionally storing the local node identifier in the configuration file 521. Step 1040 corresponds to step 720 of the method 700.

In a particular implementation of the method 1000, the local node identifier consists of the host identifier determined at step 1020.

The method 1000 comprises the step 1045 of determining a local link identifier of the communication interface 530 (corresponding to the local node identifier and local link identifier) of the computing device 500; and optionally storing the local link identifier in the configuration file 521. Step 1045 corresponds to step 725 of the method 700.

The method 1000 comprises the step 1050 of performing a secure neighbor discovery procedure to discover a remote node identifier and a remote link identifier of the remote computing device 40. Step 1050 includes at least all the steps of the method 800 allowing the computing device 500 to perform the secure discovery of the remote node identifier and the remote link identifier of the remote computing device 40. These steps have not been detailed in FIGS. 11A-C for simplification purposes.

The method 1000 comprises the step 1060 of comparing the local node identifier and the remote node identifier. Step 1060 corresponds to step 740 of the method 700.

If the local node identifier is greater than the remote node identifier, the method 1000 performs step 1065 of generating the link IPv6 address by combining the second IPv6 base prefix stored in the configuration file 521, the local node identifier, the remote node identifier, the local link identifier and an indicator that the local node identifier is greater than the remote node identifier. Step 1065 corresponds to step 745 of the method 700.

If the local node identifier is lower than the remote node identifier, the method 1000 performs step 1066 of generating the link IPv6 address by combining the second IPv6 base prefix stored in the configuration file 521, the remote node identifier, the local node identifier, the remote link identifier and an indicator that the local node identifier is lower than the remote node identifier. Step 1066 corresponds to step 746 of the method 700.

In an alternative implementation (already mentioned previously), step 1065 is performed if the local node identifier is lower than the remote node identifier; and step 1066 is performed if the local node identifier is greater than the remote node identifier. This alternative implementation is not represented in the Figures.

The method 1000 comprises the step 1070 of configuring the communication interface 530 (corresponding to the local node identifier and local link identifier) with the link IPv6 address generated at step 865 or 866. Step 1070 corresponds to step 750 of the method 700.

If step 1050 further includes at least all the steps of the method 800 allowing the remote computing device 40 to securely discover the local node identifier and the local link identifier of the computing device 500, then a corresponding link IPv6 address can be generated for the corresponding communication interface of the remote computing device 40. The generation of the corresponding link IPv6 address of the remote computing device 40 is based on the same algorithm used for the generation of the link IPv6 address of the computing device 500. The generation of the corresponding link IPv6 address has been previously described and illustrated in FIGS. 8A and 8B.

Several communication interfaces 530 of the computing device 500 can be configured with a link IPv6 address by repeating steps 1040 to 1070 of the method 1000 for each communication interface 530.

All the details and specificities of the respective steps of the methods 600, 700 and 800 (which have been previously addressed when describing the methods 600, 700 and 800) also apply to the corresponding steps of the method 1000. Such details and specificities have not been repeated when describing the method 1000 for simplification purposes.

Although the present disclosure has been described hereinabove by way of non-restrictive, illustrative embodiments thereof, these embodiments may be modified at will within the scope of the appended claims without departing from the spirit and nature of the present disclosure.

What is claimed is:
1. A computing device comprising:
a communication interface; and
a processing unit comprising one or more processor(s) for performing a secure discovery, the processing unit:
   determining a local node identifier for the communication interface;
   generating a local challenge;
   encrypting the local node identifier of the communication interface into an encrypted local node identifier of the communication interface;
   encrypting the local challenge into an encrypted local challenge;
   transmitting via the communication interface a discovery request message comprising the encrypted local node identifier of the communication interface and the encrypted local challenge;

receiving from a remote computing device via the communication interface a discovery response message in response to the discovery request message, the discovery response message comprising an encrypted remote node identifier associated with a remote communication interface of the remote computing device and an encrypted local challenge response;

decrypting the encrypted local challenge response into a local challenge response;

generating an expected local challenge response based at least on the local challenge;

determining whether the local challenge response corresponds to the expected local challenge response and the secure discovery is successful or whether the local challenge response does not correspond to the expected local challenge response and the secure discovery is a failure; and when the secure discovery is successful, decrypting the encrypted remote node identifier associated with the remote communication interface of the remote computing device into a remote node identifier associated with the remote communication interface of the remote computing device.

2. The computing device of claim 1, wherein the discovery response message further comprises an encrypted remote challenge, and when the secure discovery is successful, the processing unit further:

decrypts the encrypted remote challenge into a remote challenge;

generates a remote challenge response based at least on the remote challenge;

encrypts the remote challenge response into an encrypted remote challenge response;

transmits to the remote computing device via the communication interface a discovery acknowledgment message comprising the encrypted remote challenge response.

3. The computing device of claim 1, wherein a shared key is used for encrypting the local node identifier and the local challenge, and for decrypting the encrypted local challenge response and the encrypted remote node identifier.

4. The computing device of claim 1, wherein the discovery request message is multicast or broadcasted.

5. The computing device of claim 1, wherein the discovery request message is compliant with the Link Layer Discovery Protocol (LLDP).

6. The computing device of claim 1, wherein the processing unit further determines a local link identifier for the communication interface, the discovery request message comprises the local link identifier of the communication interface, and the discovery response message comprises a remote link identifier associated is with the remote communication interface of the remote computing device.

7. The computing device of claim 1, wherein the local node identifier is a Media Access Control (MAC) address.

8. The computing device of claim 1, wherein the processing unit determines the local node identifier by calculating a hash of a 128 bits Universal Unique Identifier (UUID) of the computing device.

9. A method for performing a secure neighbor discovery, the method comprising:

determining by a local processing unit of a local computing device a local node identifier for a local communication interface of the local computing device;

generating by the local processing unit a local challenge;

encrypting by the local processing unit the local node identifier of the local communication interface of the local computing device into an encrypted local node identifier of the local communication interface of the local computing device;

encrypting by the local processing unit the local challenge into an encrypted local challenge;

transmitting via the local communication interface of the local computing device a discovery request message comprising the encrypted local node identifier of the local communication interface of the local computing device and the encrypted local challenge;

receiving via a remote communication interface of a remote computing device the discovery request message;

decrypting by a remote processing unit of the remote computing device the encrypted local node identifier of the local communication interface of the local computing device into the local node identifier of the local communication interface of the local computing device;

decrypting by the remote processing unit the encrypted local challenge into the local challenge;

generating by the remote processing unit a local challenge response based at least on the local challenge;

determining by the remote processing unit a remote node identifier for the remote communication interface of the remote computing device;

encrypting by the remote processing unit the remote node identifier of the remote communication interface of the remote computing device into an encrypted remote node identifier of the remote communication interface of the remote computing device;

encrypting by the remote processing unit the local challenge response into an encrypted local challenge response;

transmitting to the local computing device via the remote communication interface of the remote computing device a discovery response message comprising the encrypted remote node identifier of the remote communication interface of the remote computing device and the encrypted local challenge response;

receiving via the local communication interface of the local computing device the discovery response message;

decrypting by the local processing unit the encrypted local challenge response into the local challenge response;

generating by the local processing unit an expected local challenge response based at least on the local challenge;

determining by the local processing unit that the secure discovery is successful if the local challenge response corresponds to the expected local challenge response and determining that the secure discovery is a failure if the local challenge response does not correspond to the expected local challenge response; and if the secure discovery is successful, decrypting by the local processing unit the encrypted remote node identifier of the remote communication interface of the remote computing device into the remote node identifier of the remote communication interface of the remote computing device.

10. The method of claim 9, further comprising:

generating by the remote processing unit a remote challenge;

encrypting by the remote processing unit the remote challenge into an encrypted remote challenge;

transmitting the encrypted remote challenge into the discovery response message; and if the secure discovery is successful:

decrypting by the local processing unit the encrypted remote challenge into the remote challenge;

generating by the local processing unit a remote challenge response based at least on the remote challenge;

encrypting by the local processing unit the remote challenge response into an encrypted remote challenge response;

transmitting to the remote computing device via the local communication interface of the local computing device a discovery acknowledgment message comprising the encrypted remote challenge response;

receiving via the remote communication interface of the remote computing device the discovery acknowledgment message;

decrypting by the remote processing unit the encrypted remote challenge response into the remote challenge response;

generating by the remote processing unit an expected remote challenge response based at least on the remote challenge; and determining by the remote processing unit that the remote challenge response corresponds to the expected remote challenge response.

11. The method of claim 9, wherein a shared key is used for performing all the encryptions and decryptions.

12. A computing device comprising:

a communication interface; and a processing unit comprising one or more processor(s) for performing a secure discovery, the processing unit:

determining a local node identifier for the communication interface;

generating a local challenge;

encrypting a combination of the local node identifier of the communication interface and the local challenge into an encrypted combination of the local node identifier of the communication interface and the local challenge;

transmitting via the communication interface a discovery request message comprising the encrypted combination of the local node identifier of the communication interface and the local challenge;

receiving from a remote computing device via the communication interface a discovery response message in response to the discovery request message, the discovery response message comprising an encrypted combination of a remote node identifier associated with a remote communication interface of the remote computing device and a local challenge response;

decrypting the encrypted combination of the remote node identifier associated with the remote communication interface of the remote computing device and the local challenge response into the remote node identifier associated with the remote communication interface of the remote computing device and the local challenge response;

generating an expected local challenge response based at least on the local challenge; and determining whether the local challenge response corresponds to the expected local challenge response and the secure discovery is successful of whether the local challenge response does not correspond to the expected local challenge response and the secure discovery is a failure.

\* \* \* \* \*